US012520412B2

(12) United States Patent
Smorenburg et al.

(10) Patent No.: US 12,520,412 B2
(45) Date of Patent: Jan. 6, 2026

(54) METHODS AND APPARATUS FOR CONTROLLING ELECTRON DENSITY DISTRIBUTIONS

(71) Applicant: ASML Netherlands B.V., Veldhoven (NL)

(72) Inventors: Petrus Wilhelmus Smorenburg, Veldhoven (NL); Otger Jan Luiten, Eindhoven (NL); Brian Herman Schaap, Eindhoven (NL); Jim Gerardus Hubertus Franssen, Grathem (NL)

(73) Assignee: ASML Netherlands B.V., Veldhoven (NL)

( * ) Notice: Subject to any disclaimer, the term of this patent is extended or adjusted under 35 U.S.C. 154(b) by 339 days.

(21) Appl. No.: 18/268,122

(22) PCT Filed: Nov. 23, 2021

(86) PCT No.: PCT/EP2021/082663

§ 371 (c)(1),
(2) Date: Jun. 16, 2023

(87) PCT Pub. No.: WO2022/135811

PCT Pub. Date: Jun. 30, 2022

(65) Prior Publication Data

US 2024/0324089 A1 Sep. 26, 2024

(30) Foreign Application Priority Data

Dec. 21, 2020 (EP) .................................... 20216083

(51) Int. Cl.
*H05G 2/00* (2006.01)

(52) U.S. Cl.
CPC .................................... *H05G 2/00* (2013.01)

(58) Field of Classification Search
CPC .. H05G 2/00; G21K 1/08; H01J 31/00; H05H 7/08; H05H 2007/084; H05H 2007/087
See application file for complete search history.

(56) References Cited

U.S. PATENT DOCUMENTS

| | | | | |
|---|---|---|---|---|
| 5,247,562 A * | 9/1993 | Steinbach | ................ | H05G 2/00 372/5 |
| 5,541,944 A * | 7/1996 | Neil | ...................... | H01S 3/0903 372/2 |

(Continued)

FOREIGN PATENT DOCUMENTS

| | | | |
|---|---|---|---|
| EP | 1 628 164 A2 | 2/2006 | |
| JP | 2002-139758 A | 5/2002 | |

(Continued)

OTHER PUBLICATIONS

International Search Report and Written Opinion of the International Searching Authority directed to International Patent Application No. PCT/EP2021/082663, mailed Feb. 28, 2022; 10 pages.

(Continued)

*Primary Examiner* — David A Vanore
(74) *Attorney, Agent, or Firm* — Sterne, Kessler, Goldstein & Fox P.L.L.C.

(57) ABSTRACT

A method for controlling a density distribution of electrons provided by an electron source for use in hard X-ray, soft X-ray and/or extreme ultraviolet generation, the method comprising generating a plurality of electrons from a pattern of ultracold excited atoms using an ionization laser inside a cavity, wherein the electrons have a density distribution determined by at least one of the patterns of excited atoms and the ionization laser, and accelerating the electrons out of the cavity using a non-static acceleration profile, wherein the acceleration profile controls the density distribution of the electrons as they exit the cavity.

18 Claims, 9 Drawing Sheets

(56) References Cited

U.S. PATENT DOCUMENTS

| | | | | |
|---|---|---|---|---|
| 6,549,608 | B1 | 4/2003 | Mamine et al. | |
| 6,925,253 | B2 | 8/2005 | Miyatake | |
| 7,701,577 | B2 | 4/2010 | Straaijer et al. | |
| 7,791,724 | B2 | 9/2010 | Den Boef et al. | |
| 8,115,926 | B2 | 2/2012 | Straaijer | |
| 8,553,227 | B2 | 10/2013 | Jordanoska | |
| 8,681,312 | B2 | 3/2014 | Straaijer | |
| 8,692,994 | B2 | 4/2014 | Straaijer | |
| 8,792,096 | B2 | 7/2014 | Straaijer | |
| 8,797,554 | B2 | 8/2014 | Straaijer | |
| 8,823,922 | B2 | 9/2014 | Den Boef | |
| 2002/0057760 | A1* | 5/2002 | Carroll | H05G 2/00 378/119 |
| 2003/0202546 | A1* | 10/2003 | Hartemann | G03F 7/70008 372/5 |
| 2006/0222147 | A1* | 10/2006 | Filkins | H05G 2/00 378/119 |
| 2007/0224518 | A1 | 9/2007 | Yokhin et al. | |
| 2010/0328655 | A1 | 12/2010 | Den Boef | |
| 2011/0026032 | A1 | 2/2011 | Den Boef et al. | |
| 2011/0102753 | A1 | 5/2011 | Van De Kerkhof et al. | |
| 2011/0249244 | A1 | 10/2011 | Leewis et al. | |
| 2012/0044470 | A1 | 2/2012 | Smilde et al. | |
| 2012/0288065 | A1* | 11/2012 | Graves | B82Y 20/00 378/119 |
| 2013/0162996 | A1 | 6/2013 | Straaijer et al. | |
| 2013/0304424 | A1 | 11/2013 | Bakeman et al. | |
| 2014/0019097 | A1 | 1/2014 | Bakeman et al. | |
| 2015/0285749 | A1* | 10/2015 | Moncton | G01N 23/207 378/86 |
| 2016/0014874 | A1* | 1/2016 | Kaganovich | H01S 4/00 378/119 |
| 2016/0161863 | A1 | 6/2016 | Den Boef et al. | |
| 2016/0227639 | A1* | 8/2016 | Kaminer | H05H 3/00 |
| 2016/0370717 | A1 | 12/2016 | Den Boef et al. | |
| 2019/0003988 | A1 | 1/2019 | Solarz et al. | |
| 2019/0215940 | A1 | 7/2019 | Khodykin et al. | |
| 2019/0239332 | A1 | 8/2019 | Hidding et al. | |
| 2020/0085388 | A1* | 3/2020 | Fuchs | A61B 6/40 |
| 2021/0400796 | A1* | 12/2021 | Luiten | H05G 2/00 |
| 2024/0030675 | A1* | 1/2024 | Fuchs | H01S 4/00 |
| 2024/0244738 | A1* | 7/2024 | Walczak | H05H 15/00 |
| 2024/0324089 | A1* | 9/2024 | Smorenburg | H05G 2/00 |
| 2025/0056703 | A1* | 2/2025 | Balanov | H05G 2/00 |

FOREIGN PATENT DOCUMENTS

| | | | |
|---|---|---|---|
| TW | 454428 | B | 9/2001 |
| TW | 2009-24567 | A | 6/2009 |
| WO | WO 2011/012624 | A1 | 2/2011 |
| WO | WO 2020/089454 | A1 | 5/2020 |

OTHER PUBLICATIONS

International Preliminary Report on Patentability directed to International Patent Application No. PCT/EP2021/082663, issued Jun. 13, 2023; 7 pages.

Lemaillet et al., “Intercomparison between optical and x-ray scatterometry measurements of FinFET structures,” Proc. SPIE, vol. 8681, Metrology, Inspection, and Process Control for Microlithography XXVII, Apr. 10, 2023; 8 pages.

Franssen et al., “From ultracold electrons to coherent soft x-rays,” arXiv: Accelerator Physics, May 10, 2019; pp. 1-5.

Xia et al., “An ultracold low emittance electron source,” Journal of Instrumentation, vol. 9, Jun. 9, 2014; 17 pages.

Van Der Geer et al., “An ultracold electron source as an injector for a compact SASE-FEL,” Journal of Physics B: Atomic, Molecular, and Optical Physics, vol. 47, No. 23, Nov. 24, 2014; pp. 1-8.

Taban et al., “Design and validation of an accelerator for an ultracold electron source,” Physical Review Special Topics, vol. 11, No. 050102, May 7, 2008; pp. 1-8.

Stupakov G., “Beam Echo Effect for Generation of Short Wavelength Radiation*,” Physical Review Letters, vol. 102, No. 7, Feb. 17, 2009; 8 pages.

Ribic et al., “Coherent soft x-ray pulses from an echo-enabled harmonic generation free-electron laser,” Nature Photonics, vol. 13, May 6, 2019; 19 pages.

Japanese Notice of Reasons for Refusal directed to Japanese Patent Application No. 2023- 532670, mailed Sep. 17, 2025; 9 pages.

* cited by examiner

METHODS AND APPARATUS FOR CONTROLLING ELECTRON DENSITY DISTRIBUTIONS

CROSS REFERENCE TO RELATED APPLICATIONS

This application claims priority of EP application 20216083.4 which was filed on 2020 Dec. 21 and which is incorporated herein in its entirety by reference.

FIELD

The present invention relates to methods, assemblies and apparatus for controlling electron density distributions for use in relation to radiation generation. Specifically, it relates to the control of the density distribution of electrons as they exit a cavity for use in hard X-ray, soft X-ray and/or extreme ultraviolet generation.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

Low-k1 lithography may be used to process features with dimensions smaller than the classical resolution limit of a lithographic apparatus. In such process, the resolution formula may be expressed as $CD=k1\times\lambda/NA$, where $\lambda$ is the wavelength of radiation employed, NA is the numerical aperture of the projection optics in the lithographic apparatus, CD is the "critical dimension" (generally the smallest feature size printed, but in this case half-pitch) and k1 is an empirical resolution factor. In general, the smaller k1 the more difficult it becomes to reproduce the pattern on the substrate that resembles the shape and dimensions planned by a circuit designer in order to achieve particular electrical functionality and performance. To overcome these difficulties, sophisticated fine-tuning steps may be applied to the lithographic projection apparatus and/or design layout. These include, for example, but not limited to, optimization of NA, customized illumination schemes, use of phase shifting patterning devices, various optimization of the design layout such as optical proximity correction (OPC, sometimes also referred to as "optical and process correction") in the design layout, or other methods generally defined as "resolution enhancement techniques" (RET). Alternatively, tight control loops for controlling a stability of the lithographic apparatus may be used to improve reproduction of the pattern at low k1.

Metrology tools may be used to measure and inspect the patterns and devices created using a lithographic apparatus. Due to the pattern dimensions in lithographic processes, there is an increasing need for high-throughput optical metrology tools that operate using short wavelength probe radiation. High throughput may limit the amount of time and cost of inspection during a lithographic process. Short wavelength probe radiation is needed to be able achieve the required resolution and penetration depth, both of which are wavelength-dependent. Conventional tools, such as for example optical metrology tools using visible wavelengths, may be insufficient to resolve patterned lithography structures. Short wavelength tools may include for example EUV and X-ray radiation, including soft X-ray and hard X-ray radiation, which can achieve higher resolutions.

Shorter wavelength radiation sources can address challenges with resolution. However, there is a lack of high-brilliance radiation sources at shorter wavelengths, which are required for metrology in high-volume manufacturing applications. The current application addresses this problem by describing methods, assemblies, and apparatus for achieving increased brilliance radiation sources.

SUMMARY

It is an object of the present invention to provide a method for controlling a density distribution of electrons provided by an electron source for use in hard X-ray, soft X-ray and/or extreme ultraviolet generation. The method comprises generating a plurality of electrons from a pattern of ultracold excited atoms using an ionization laser inside a cavity, wherein the electrons have a density distribution is determined by at least one of the patterns of excited atoms and the ionization laser. The electrons are accelerated out of the cavity using a non-static acceleration profile. The acceleration profile controls the density distribution of the electrons as they exit the cavity.

Optionally, the acceleration profile may control the velocity of the electrons in the cavity such that the velocity of the electrons is substantially equal as they exit the cavity.

Optionally, the density distribution of electrons may comprise a plurality of bunches of electrons.

Optionally, the acceleration profile may reduce chirp in the density distribution of electrons exiting the cavity.

Optionally, the acceleration may comprise a non-static electromagnetic field.

Optionally, the non-static electromagnetic field may comprise a component that varies in time.

Optionally, the non-static electromagnetic field may comprise a component that varies in position within the cavity.

Optionally, the electron density distribution may match the pattern of ultracold excited atoms.

Optionally, the electron density distribution may be determined by a structured ionization laser.

Optionally, the cavity may be a resonant microwave structure.

Optionally, the hard X-ray, soft X-ray and/or extreme ultraviolet generation may be achieved using inverse Compton scattering.

According to another aspect of the current disclosure there is provided an apparatus for controlling a density distribution of electrons provided by an electron source for use in hard X-ray, soft X-ray and/or extreme ultraviolet generation, wherein the apparatus is configured to perform a method as described above.

According to another aspect of the current disclosure there is provided a radiation source comprising an apparatus as set out above.

According to another aspect of the current disclosure there is provided a metrology apparatus comprising an apparatus as set out above.

According to another aspect of the current disclosure there is provided a lithographic cell comprising an apparatus as set out above.

According to another aspect of the current disclosure there is provided a method of compressing a density distribution comprising bunches of electrons for coherent hard X-ray, soft X-ray and/or extreme ultraviolet generation. The method comprises receiving a plurality of electron bunches having a density distribution, and compressing the plurality of electron bunches such that the distance between the bunches along a propagation direction of the electron bunches corresponds with a wavelength of hard X-ray, soft X-ray and/or extreme ultraviolet radiation to be generated.

Optionally the bunches of electrons may be are compressed using echo enhanced harmonic generation.

Optionally, the bunches of electrons may be compressed using electron optics.

Optionally, the coherent hard X-ray, soft X-ray and/or extreme ultraviolet generation may be achieved using inverse Compton scattering.

According to another aspect of the current disclosure there is provided an assembly for compressing a density distribution comprising bunches of electrons for coherent hard X-ray, soft X-ray and/or extreme ultraviolet generation. The assembly is configured to perform a method of compressing a density distribution as described above.

According to another aspect of the current disclosure, there is provided a method of echo-enhanced harmonic generation for coherent hard X-ray, soft X-ray and/or extreme ultraviolet generation. The method comprises receiving a plurality of bunches of electrons, wherein each bunch comprises a momentum spread. The electrons are provided through a dispersive section, introducing a skew in phase space along a direction of propagation. A momentum modulation is applied, using an optical modulator, to the bunches of electrons that is periodic along the direction of propagation; The electrons are propagated through a second dispersive section, introducing a second skew in phase space along the direction of propagation. The second skew modifies the modulated momentum of the bunches to provide a plurality of bunches with a reduced separation along the direction of propagation compared to the received plurality of bunches.

According to another aspect of the current disclosure, there is provided a method of generating attosecond hard X-ray, soft X-ray and/or extreme ultraviolet pulses. The method comprises obtaining a plurality of bunches of electrons, introducing a chirp in a separation between the plurality of bunches, and irradiating the chirped bunches with a counter-propagating chirped radiation pulse for generating hard X-ray, soft X-ray and/or extreme ultraviolet radiation. The separation chirp of the bunches matches the chirp of the radiation pulse according to a resonance condition, thereby generating an attosecond hard X-ray, soft X-ray and/or extreme ultraviolet pulse.

Optionally, the separation chirp in the bunches and the in radiation pulse may be positive.

Optionally, the kinetic energy chirp may be set to control the bandwidth of the hard X-ray, soft X-ray and/or extreme ultraviolet radiation to be generated.

Optionally, introducing a chirp on a separation between the plurality of bunches may comprise controlling the longitudinal rate of change of at least one of the kinetic energy of the bunches of electrons and the pitch of the bunches of electrons.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation and particle radiation, including ultraviolet radiation (e.g. with a wavelength of 365, 248, 193, 157 or 126 nm), EUV (extreme ultra-violet radiation, e.g. having a wavelength in the range of about 5-100 nm), X-ray radiation, electron beam radiation and other particle radiation.

The term “reticle”, “mask” or “patterning device” as employed in this text may be broadly interpreted as referring to a generic patterning device that can be used to endow an incoming radiation beam with a patterned cross-section, corresponding to a pattern that is to be created in a target portion of the substrate. The term “light valve” can also be used in this context. Besides the classic mask (transmissive or reflective, binary, phase-shifting, hybrid, etc.), examples of other such patterning devices include a programmable mirror array and a programmable LCD array.

Figure 1:
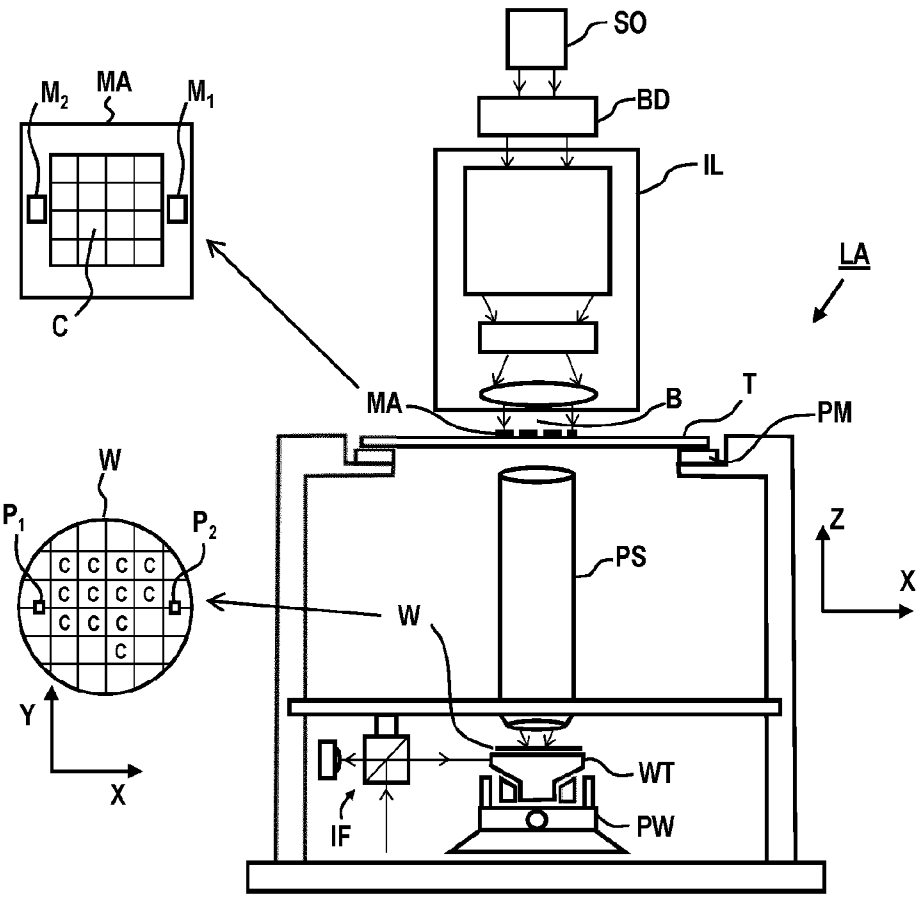
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation, EUV radiation or X-ray radiation), a mask support (e.g., a mask table) T constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, diffractive, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term “projection system” PS used herein should be broadly interpreted as encompassing various types of projection system, including refractive, reflective, diffractive, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term “projection lens” herein may be considered as synonymous with the more general term “projection system” PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference in its entirety.

The lithographic apparatus LA may also be of a type having two or more substrate supports WT (also named “dual stage”). In such “multiple stage” machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support T, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT may be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

Figure 2:
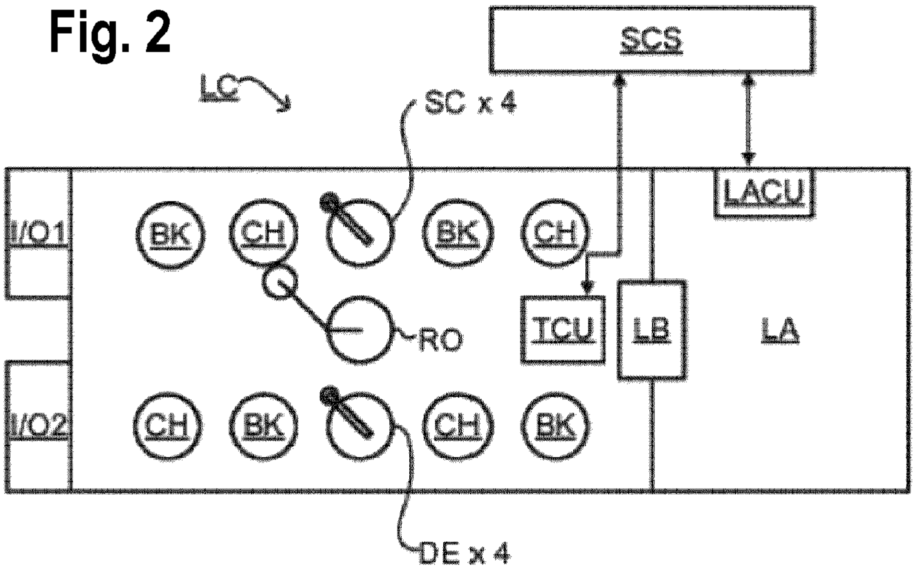
FIG. 2 depicts a schematic overview of a lithographic cell.

As shown in FIG. 2 the lithographic apparatus LA may form part of a lithographic cell LC, also sometimes referred to as a lithocell or (litho)cluster, which often also includes apparatus to perform pre- and post-exposure processes on a substrate W. Conventionally these include spin coaters SC to deposit resist layers, developers DE to develop exposed resist, chill plates CH and bake plates BK, e.g. for conditioning the temperature of substrates W e.g. for conditioning solvents in the resist layers. A substrate handler, or robot, RO picks up substrates W from input/output ports I/O1, I/O2, moves them between the different process apparatus and delivers the substrates W to the loading bay LB of the lithographic apparatus LA. The devices in the lithocell, which are often also collectively referred to as the track, may be under the control of a track control unit TCU that in itself may be controlled by a supervisory control system SCS, which may also control the lithographic apparatus LA, e.g. via lithography control unit LACU.

In lithographic processes, it is desirable to make frequently measurements of the structures created, e.g., for process control and verification. Tools to make such measurement may be called metrology tools MT. Different types of metrology tools MT for making such measurements are known, including scanning electron microscopes or various forms of scatterometer metrology tools MT. Scatterometers are versatile instruments which allow measurements of the parameters of a lithographic process by having a sensor in or close to the pupil or a conjugate plane with the pupil of the objective of the scatterometer, measurements usually referred as pupil based measurements, or by having the sensor in or close to an image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers may measure gratings using light from hard X-ray (HXR), soft X-ray (SXR), extreme ultraviolet (EUV), visible to near-infrared (IR) and IR wavelength range. In case that the radiation is hard X-ray or soft X-ray, the aforementioned scatterometers may optionally be a small-angle X-ray scattering metrology tool.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), shape of structures, etc. For this purpose, inspection tools and/or metrology tools (not shown) may be included in the lithocell LC. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of the lithocell LC, or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

In a first embodiment, the scatterometer MT is an angular resolved scatterometer. In such a scatterometer reconstruction methods may be applied to the measured signal to reconstruct or calculate properties of the grating. Such reconstruction may, for example, result from simulating interaction of scattered radiation with a mathematical model of the target structure and comparing the simulation results with those of a measurement. Parameters of the mathematical model are adjusted until the simulated interaction produces a diffraction pattern similar to that observed from the real target.

In a second embodiment, the scatterometer MT is a spectroscopic scatterometer MT. In such spectroscopic scatterometer MT, the radiation emitted by a radiation source is directed onto the target and the reflected, transmitted or scattered radiation from the target is directed to a spectrometer detector, which measures a spectrum (i.e. a measurement of intensity as a function of wavelength) of the specular reflected radiation. From this data, the structure or profile of the target giving rise to the detected spectrum may be reconstructed, e.g. by Rigorous Coupled Wave Analysis and non-linear regression or by comparison with a library of simulated spectra.

In a third embodiment, the scatterometer MT is an ellipsometric scatterometer. The ellipsometric scatterometer allows for determining parameters of a lithographic process by measuring scattered or transmitted radiation for each polarization states. Such metrology apparatus emits polarized light (such as linear, circular, or elliptic) by using, for example, appropriate polarization filters in the illumination section of the metrology apparatus. A source suitable for the metrology apparatus may provide polarized radiation as well. Various embodiments of existing ellipsometric scatterometers are described in U.S. patent application Ser. Nos. 11/451,599, 11/708,678, 12/256,780, 12/486,449, 12/920,968, 12/922,587, 13/000,229, 13/033,135, 13/533,110 and 13/891,410 incorporated herein by reference in their entirety.

In one embodiment of the scatterometer MT, the scatterometer MT is adapted to measure the overlay of two misaligned gratings or periodic structures by measuring asymmetry in the reflected spectrum and/or the detection configuration, the asymmetry being related to the extent of the overlay. The two (maybe overlapping) grating structures may be applied in two different layers (not necessarily consecutive layers), and may be formed substantially at the same position on the wafer. The scatterometer may have a symmetrical detection configuration as described e.g. in co-owned patent application EP1,628,164A, such that any asymmetry is clearly distinguishable. This provides a straightforward way to measure misalignment in gratings. Further examples for measuring overlay error between the two layers containing periodic structures as target is measured through asymmetry of the periodic structures may be found in PCT patent application publication no. WO 2011/012624 or US patent application US 20160161863, incorporated herein by reference in its entirety.

Other parameters of interest may be focus and dose. Focus and dose may be determined simultaneously by scatterometry (or alternatively by scanning electron microscopy) as described in US patent application US2011-0249244, incorporated herein by reference in its entirety. A single structure may be used which has a unique combination of critical dimension and sidewall angle measurements for each point in a focus energy matrix (FEM—also referred to as Focus Exposure Matrix). If these unique combinations of critical dimension and sidewall angle are available, the focus and dose values may be uniquely determined from these measurements.

A metrology target may be an ensemble of composite gratings, formed by a lithographic process, mostly in resist, but also after etch process for example. The pitch and line-width of the structures in the gratings may strongly depend on the measurement optics (in particular the NA of the optics) to be able to capture diffraction orders coming from the metrology targets. As indicated earlier, the diffracted signal may be used to determine shifts between two layers (also referred to 'overlay') or may be used to reconstruct at least part of the original grating as produced by the lithographic process. This reconstruction may be used to provide guidance of the quality of the lithographic process and may be used to control at least part of the lithographic process. Targets may have smaller sub-segmentation which are configured to mimic dimensions of the functional part of the design layout in a target. Due to this sub-segmentation, the targets will behave more similar to the functional part of the design layout such that the overall process parameter measurements resemble the functional part of the design layout better. The targets may be measured in an underfilled mode or in an overfilled mode. In the underfilled mode, the measurement beam generates a spot that is smaller than the overall target. In the overfilled mode, the measurement beam generates a spot that is larger than the overall target. In such overfilled mode, it may also be possible to measure different targets simultaneously, thus determining different processing parameters at the same time.

Overall measurement quality of a lithographic parameter using a specific target is at least partially determined by the measurement recipe used to measure this lithographic parameter. The term "substrate measurement recipe" may include one or more parameters of the measurement itself, one or more parameters of the one or more patterns measured, or both. For example, if the measurement used in a substrate measurement recipe is a diffraction-based optical measurement, one or more of the parameters of the measurement may include the wavelength of the radiation, the polarization of the radiation, the incident angle of radiation relative to the substrate, the orientation of radiation relative to a pattern on the substrate, etc. One of the criteria to select a measurement recipe may, for example, be a sensitivity of one of the measurement parameters to processing variations. More examples are described in US patent application US2016-0161863 and published US patent application US 2016/0370717A1 incorporated herein by reference in its entirety.

Figure 3:
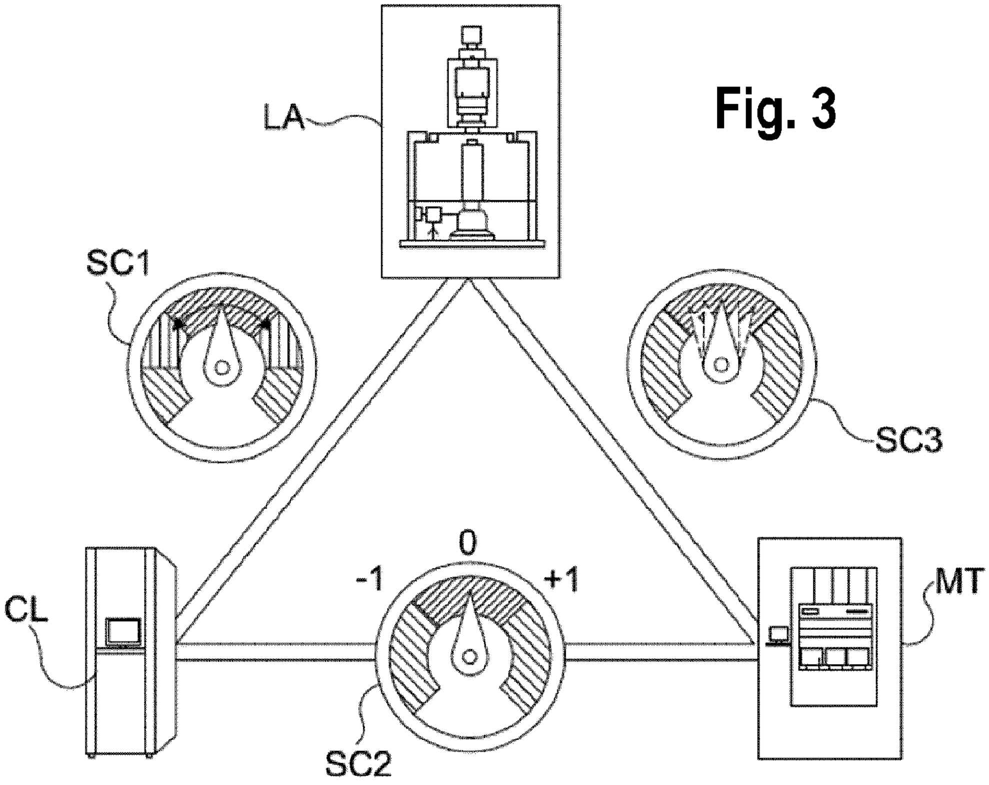
FIG. 3 depicts a schematic representation of holistic lithography, representing a cooperation between three key technologies to optimize semiconductor manufacturing.

The patterning process in a lithographic apparatus LA may be one of the most critical steps in the processing which requires high accuracy of dimensioning and placement of structures on the substrate W. To ensure this high accuracy, three systems may be combined in a so called "holistic" control environment as schematically depicted in FIG. 3. One of these systems is the lithographic apparatus LA which is (virtually) connected to a metrology tool MT (a second system) and to a computer system CL (a third system). The key of such "holistic" environment is to optimize the cooperation between these three systems to enhance the overall process window and provide tight control loops to ensure that the patterning performed by the lithographic apparatus LA stays within a process window. The process window defines a range of process parameters (e.g. dose, focus, overlay) within which a specific manufacturing process yields a defined result (e.g. a functional semiconductor device)—maybe within which the process parameters in the lithographic process or patterning process are allowed to vary.

The computer system CL may use (part of) the design layout to be patterned to predict which resolution enhancement techniques to use and to perform computational lithography simulations and calculations to determine which mask layout and lithographic apparatus settings achieve the largest overall process window of the patterning process (depicted in FIG. 3 by the double arrow in the first scale SC1). The resolution enhancement techniques may be arranged to match the patterning possibilities of the lithographic apparatus LA. The computer system CL may also be used to detect where within the process window the lithographic apparatus LA is currently operating (e.g. using input from the metrology tool MET) to predict whether defects may be present due to e.g. sub-optimal processing (depicted in FIG. 3 by the arrow pointing "0" in the second scale SC2).

The metrology tool MT may provide input to the computer system CL to enable accurate simulations and predictions, and may provide feedback to the lithographic apparatus LA to identify possible drifts, e.g. in a calibration status of the lithographic apparatus LA (depicted in FIG. 3 by the multiple arrows in the third scale SC3).

Figure 4:
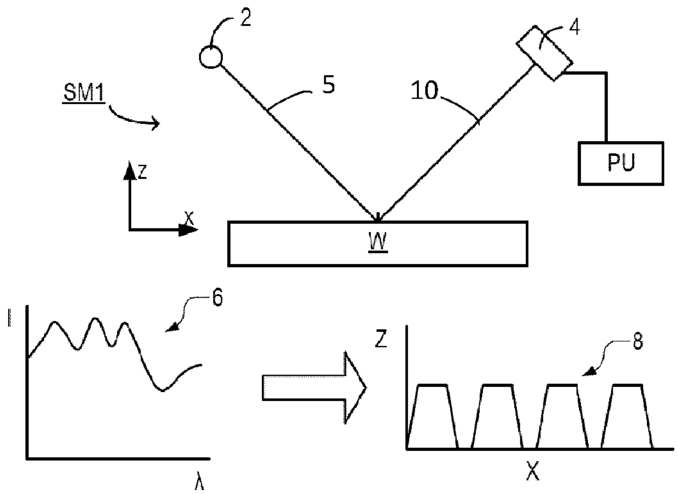
FIG. 4 schematically illustrates a scatterometry apparatus.

One example of a metrology apparatus, such as a scatterometer, is depicted in FIG. 4. It may comprise a broadband (e.g. white light) radiation projector 2 which projects radiation 5 onto a substrate W. The reflected or scattered radiation 10 is passed to a spectrometer detector 4, which measures a spectrum 6 (i.e. a measurement of intensity I as a function of wavelength a) of the specular reflected radiation. From this data, the structure or profile 8 giving rise to the detected spectrum may be reconstructed by processing unit PU, e.g. by Rigorous Coupled Wave Analysis and non-linear regression or by comparison with a library of simulated spectra as shown at the bottom of FIG. 4. In general, for the reconstruction, the general form of the structure is known and some parameters are assumed from knowledge of the process by which the structure was made, leaving only a few parameters of the structure to be determined from the scatterometry data. Such a scatterometer may be configured as a normal-incidence scatterometer or an oblique-incidence scatterometer.

Figure 5:
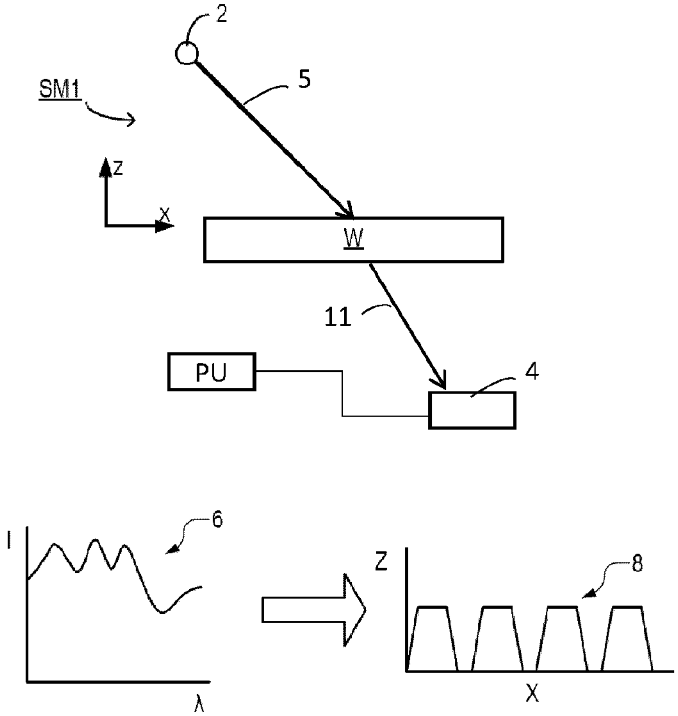
FIG. 5 schematically illustrates a transmissive scatterometry apparatus.

A transmissive version of the example of a metrology apparatus, such as a scatterometer shown in FIG. 4, is depicted in FIG. 5. The transmitted radiation 11 is passed to a spectrometer detector 4, which measures a spectrum 6 as discussed for FIG. 4. Such a scatterometer may be configured as a normal-incidence scatterometer or an oblique-incidence scatterometer. Optionally, the transmissive version using hard X-ray radiation with wavelength <1 nm, optionally <0.1 nm, optionally <0.01 nm.

As an alternative to optical metrology methods, it has also been considered to use hard X-ray, soft X-rays or EUV radiation, for example radiation with at least one of the wavelength ranges: <0.01 nm, <0.1 nm, <1 nm, between 0.01 nm and 100 nm, between 0.01 nm and 50 nm, between 1 nm and 50 nm, between 1 nm and 20 nm, between 5 nm and 20 nm, and between 10 nm and 20 nm. One example of metrology tool functioning in one of the above presented wavelength ranges is transmissive small angle X-ray scattering (T-SAXS as in US 2007224518A which content is incorporated herein by reference in its entirety). Profile (CD) measurements using T-SAXS are discussed by Lemaillet et al in "Intercomparison between optical and X-ray scatterometry measurements of FinFET structures", Proc. of SPIE, 2013, 8681. It is noted that the use of laser produced plasma (LPP) x-ray source is described in U.S. Patent Publication No. 2019/003988A1, and in U.S. Patent Publication No. 2019/215940A1, which are incorporated herein by reference in the entirety. Reflectometry techniques using X-rays (GI-XRS) and extreme ultraviolet (EUV) radiation at grazing incidence may be used for measuring properties of films and stacks of layers on a substrate. Within the general field of reflectometry, goniometric and/or spectroscopic techniques may be applied. In goniometry, the variation of a reflected beam with different incidence angles may be measured. Spectroscopic reflectometry, on the other hand, measures the spectrum of wavelengths reflected at a given angle (using broadband radiation). For example, EUV reflectometry has been used for inspection of mask blanks, prior to manufacture of reticles (patterning devices) for use in EUV lithography.

It is possible that the range of application makes the use of wavelengths in e.g. the hard-X-rays, soft X-rays or EUV domain not sufficient. Published patent applications US 20130304424A1 and US2014019097A1 (Bakeman et al/KLA) describe hybrid metrology techniques in which measurements made using x-rays and optical measurements with wavelengths in the range 120 nm and 2000 nm are combined together to obtain a measurement of a parameter such as CD. A CD measurement is obtained by coupling and x-ray mathematical model and an optical mathematical model through one or more common. The contents of the cited US patent applications are incorporated herein by reference in their entirety.

Many different forms of metrology tools MT for measuring structures created using lithographic pattering apparatus can be provided. Metrology tools MT may use electromagnetic radiation to interrogate a structure. Properties of the radiation (e.g. wavelength, bandwidth, power) can affect different measurement characteristics of the tool, with shorter wavelengths generally allowing for increased resolution. Radiation wavelength has an effect on the resolution the metrology tool can achieve. Therefore, in order to be able to measure structures with features having small dimensions, metrology tools MT with short wavelength radiation sources are preferred.

Another way in which radiation wavelength can affect measurement characteristics is penetration depth, and the transparency/opacity of materials to be inspected at the radiation wavelength. Depending on the opacity and/or penetration depth, radiation can be used for measurements in transmission or reflection. The type of measurement can affect whether information is obtained about the surface and/or the bulk interior of a structure/substrate. Therefore, penetration depth and opacity are another element to be taken into account when selecting radiation wavelength for a metrology tool.

In order to achieve higher resolution for measurement of lithographically patterned structures, metrology tools MT with short wavelengths are preferred. This may include wavelengths shorter than visible wavelengths, for example in the UV, EUV, and X-ray portions of the electromagnetic spectrum. Hard X-ray methods (HXR) such as Transmitted Small Angle X-ray Scattering (TSAXS) make use of the high resolution and high penetration depth of hard X-rays (wavelengths <0.1 nm) and may therefore operate in transmission. Soft X-rays and EUV (wavelengths >0.1 nm), on the other hand, do not penetrate the target as far but may induce a rich optical response in the material to be probed. This may be due the optical properties of many semiconductor materials, and due to the structures being comparable in size to the probing wavelength. As a result, EUV and/or soft X-ray metrology tools MT may operate in reflection, for example by imaging, or by analysing diffraction patterns from, a lithographically patterned structure. Soft X-rays may have a wavelength in the range 0.1-1 nm.

For hard X-ray, soft X-ray, and EUV radiation, applications in high volume manufacturing (HVM) applications may be limited due to a lack of available high-brilliance radiation sources at the required wavelengths. In the case of hard X-rays, commonly used sources in industrial applications include X-ray tubes. X-ray tubes, including advanced X-ray tubes for example based on liquid metal anodes or rotating anodes, may be relatively affordable and compact, but may lack brilliance required for HVM applications. High brilliance X-ray sources such as Synchrotron Light Sources (SLSs) and X-ray Free Electron Lasers (XFELs) currently exist, but their size (>100 m) and high cost (multi-100-million euro), makes them prohibitively large and expensive for metrology applications. Similarly, there is a lack of availability of sufficiently bright EUV and soft X-ray radiation sources.

Figure 6:
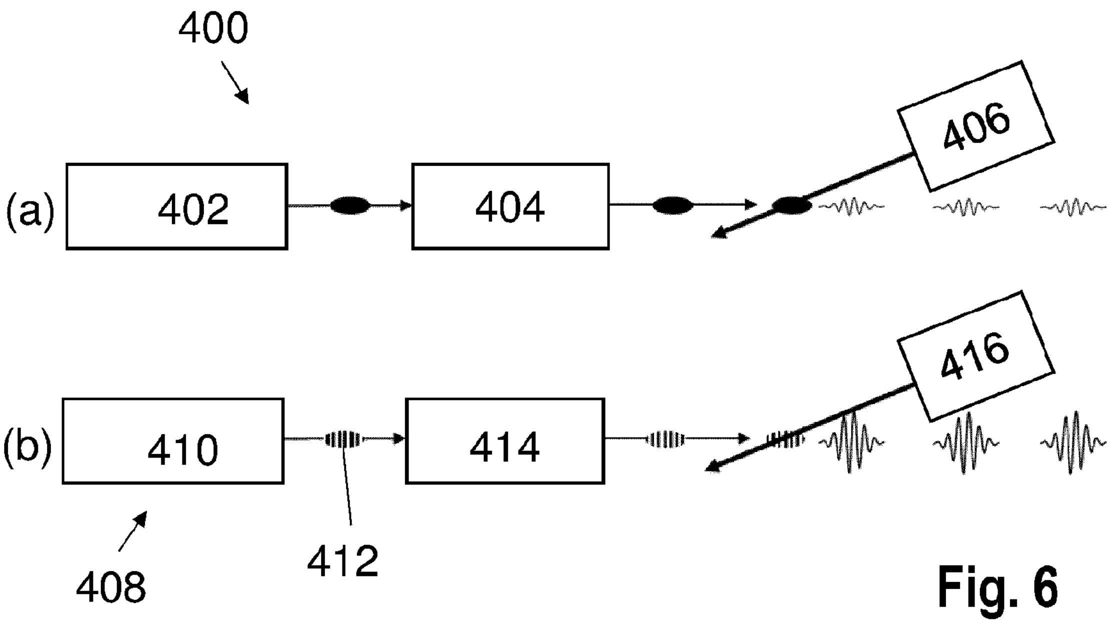
FIG. 6 depicts a schematic representation of an example inverse Compton scattering hard X-ray, soft X-ray and/or extreme ultraviolet radiation source.

A promising class of alternative sources that has a potential to provide high-brilliance X-rays or EUV is Inverse Compton Scattering (ICS) sources. FIG. 6 illustrates a schematic overview of the main components of an example ICS source 400. In (a), a pulsed electron source 402 provides pulses of electrons to an electron accelerator 404. The accelerated electrons are accelerated then irradiated by a pulsed laser 406 for emitted radiation generation. The emitted radiation may comprise wavelengths in the extreme ultraviolet, soft X-ray, and/or hard X-ray part of the electromagnetic spectrum. The emitted radiation may comprise wavelengths in one or more of the ranges of less than 1 nm, less than 0.1 nm, less than 0.01 nm, from 0.01 nm to 100 nm, from 0.1 nm to 100 nm, from 0.1 nm to 50 nm, from 1 nm to 50 nm, and from 10 nm to 20 nm. The operation of an ICS source will now be described in more detail.

The pulsed electron source 402 may be a photo-emission source, in which pulses of electrons may be ejected from a cathode by firing laser pulses, which may be UV laser pulses, onto it. The laser beam from pulsed laser 406 may have a propagation direction comprising a component that is counter-propagating to the propagation direction of the electron pulse. Alternatively or additionally, the propagation direction of pulsed laser 406 may have perpendicular, and/or co-moving components to the propagation direction of the electron pulse. The counter-propagating laser pulse may collide with the electron pulse. The electrons may be travelling at a velocity close to the speed of light. Due to the relativistic Doppler effect the laser photons that bounce off the electrons may be converted into the emitted radiation (e.g. X-ray photons), which will be used as an example in the following text. This may constitute a narrow X-ray beam travelling in the same direction as the electrons. At present, the brilliance that has been demonstrated by ICS sources is still around the order of $10^9$-$10^{11}$ photons/s/mm$^2$/mrad$^2$/0.1% BW. This brilliance is several orders of magnitude below the brilliance aimed for in the metrology applications intended for HVM setups. HMV X-ray metrology setups may require a sources with a brilliance of at least $10^{12}$-$10^{14}$ photons/s/mm$^2$/mrad$^2$/0.1% BW, with the required brightness depending on the specific application. The low brilliance of the ICS source described above may be partly due to the fact that the X-rays generated by the individual electrons add up incoherently. The incoherent addition means that the brilliance of the conventional ICS source 400 is linearly proportional to the number of electrons N. In contrast, if the X-ray photons would add coherently, the brilliance would scale quadratically to the number of electrons, proportional to $N^2$. As described in the present description, this could be achieved for example if the individual electrons emitted X-ray photons that are in phase, such that their intensity would add coherently.

One possible method for achieving coherent emission of X-ray photons in an ICS source, uses an ultracold electron source (UCES), which allows the boosting of the emitted brilliance of an ICS source by multiple orders of magnitude. In the setup, the ultracold electron source is used instead of a conventional photo-emission electron source. This is illustrated in FIG. 6 image (b), where an ICS source 408 has an ultracold electron source 410. A key benefit of using a UCES is that it may allow tailoring of the electron density distribution in the generated electron pulses, also referred to as electron clouds. In FIG. 6(*b*), the density distribution is controlled to concentrate the electrons in a train of closely spaced bunches 412 as they exit the UCES. How the bunching can be achieved is described in more detail in International patent application WO2020/089454 and Franssen, J. G. H., et al. "From ultracold electrons to coherent soft X-rays." arXiv preprint arXiv:1905.04031 (2019), which are incorporated herein by reference.

One way in which generated X-ray photons may be made to add up coherently, may be by making the spacing between the bunches of electrons in the pulse approximately equal to the wavelength of the generated X-ray radiation. This may for example be achieved in part by the accelerator 414, before the electron pulses arrive at the laser pulse 416 for X-ray generation. As mentioned above, this coherent addition may mean a significant portion of the brilliance of the ICS source becomes proportional to $N^2$, resulting in a several orders of magnitude increase in brilliance of the generated X-rays. This increase in brilliance may result in a source suitable for higher-brilliance application, such as in HVM lithography metrology tools MT. Another benefit of an UCES-driven ICS source may be that it leads to fully spatially coherent x-ray pulses, which is an important property for some applications.

To explain how the coherent X-ray generation can be achieved, it helps to understand the working principle of an ultracold electron source, which will be explained in relation to FIG. 7. In image (a), a cloud of ultracold atoms 500 may be created. The cloud may be created in an area referred to as a cavity 501. The cavity 501 may for example comprise a magneto-optical trap, which is a well-known technique in atomic physics involving a combination of laser beams and magnetic fields. In one embodiment, the cavity 501 is a microwave cavity or radio frequency (RF) cavity is a special type of resonator, consisting of a closed (or largely closed) metal structure that confines electromagnetic fields in the microwave region of the spectrum. The structure is either hollow or filled with dielectric material. The microwaves bounce back and forth between the walls of the cavity. At the cavity's resonant frequencies they reinforce to form standing waves in the cavity. Therefore, the cavity functions similarly to an organ pipe or sound box in a musical instrument, oscillating preferentially at a series of frequencies, its resonant frequencies. RF cavities can also manipulate charged particles passing through them by application of acceleration voltage and are thus used in particle accelerators and microwave vacuum tubes such as klystrons and magnetrons. Next, in image (b) atoms 502 may be excited by two counter-propagating excitation lasers 504 forming a standing wave. Alternative techniques, such as for example using a spatial light modulator, may be used to create an intensity pattern such as a standing wave. A property of a standing wave may be that the local intensity modulates every half wavelength between maximum intensity and zero. Atoms may be excited into an energetic state at the locations where the intensity is high, and atoms may not be excited where the intensity is low. This may create pattern of bunches of excited atoms. The spacing 506 between the bunches may be equal to half the wavelength of the excitation lasers 504. As an example, in FIG. 7, the spacing 506 between bunches of excited atoms may be 390 nm, created by excitation lasers 504 with a wavelength of 780 nm. In image (c) an ionization laser pulse 508 may be applied. The photon energy of pulse 508 may be sufficiently high to ionize the excited atoms, but not high enough to ionize non-excited atoms. This may therefore result in the generation of an electron cloud 510 with substantially the same bunch structure of excited atoms 506 that was created by the standing wave pattern. An electron cloud may in this description be referred to as an electron pulse. Electrons may be generated where there has been both a combination of high excitation laser intensity and high ionization laser intensity. Therefore, alternative embodiments to generate an electron cloud may include a structures ionization laser (e.g. a standing wave or SLM-generated) in combination with an unstructured excitation laser, a combination of a structured excitation laser and an structure ionization laser. In the latter embodiment, more complex electron cloud patterns may be generated, for example by combining excitation and ionization lasers with different intensity patterns. In image (d) the structured electron cloud 510 may be accelerated out of the cavity 501 by means of a static electric field 512 between electrodes 514(*a*), 514(*b*).

Figure 7:
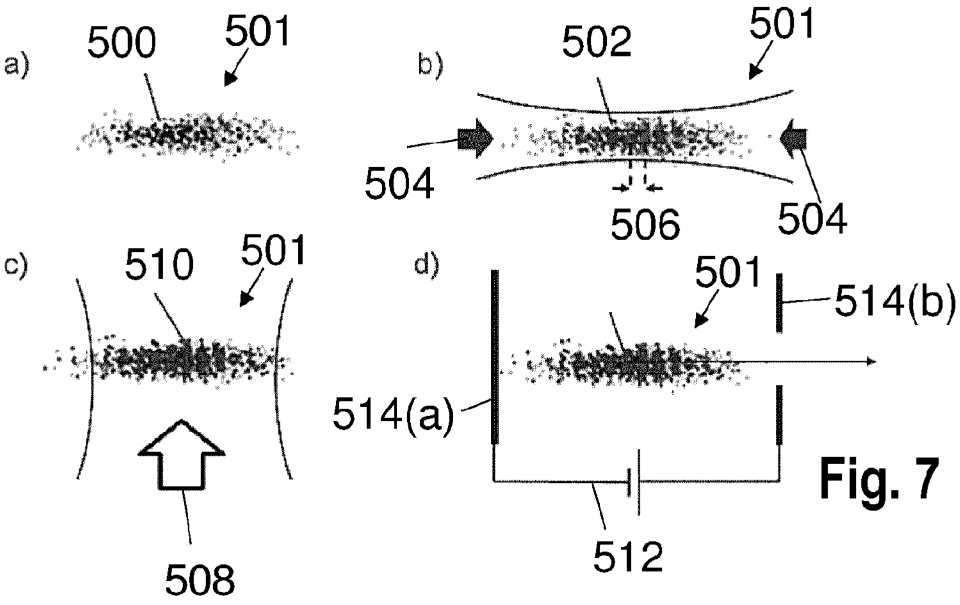
FIGS. 7(*a*)-7(*d*) depicts schematic representation of steps in a method of generating an ultracold electron pulse.

The inventors identified a problem associated with the ultracold electron generation method described in relation to FIG. 7. Namely, in image (d) above, the electrons are accelerated by an electrostatic field. Such a field may be typically created by applying a static voltage between a back and front electrode surrounding the atomic cloud 506 in the cavity 501, as indicated in FIG. 7. However, a problem with this scheme may be that the electrons that originate from atoms closer to the back electrode 514(*a*) may spend more time in the accelerating field 512 before leaving through the aperture in the front electrode 514(*b*) than the electrons originating from atoms closer to the front electrode 514(*b*). As a result, the electrons created in the back of cavity 501 may leave the cavity 501 with a higher velocity than the electrons created in the front. The electrons created at the back may start to catch up and/or overtake the electrons created at the front.

Figure 8:
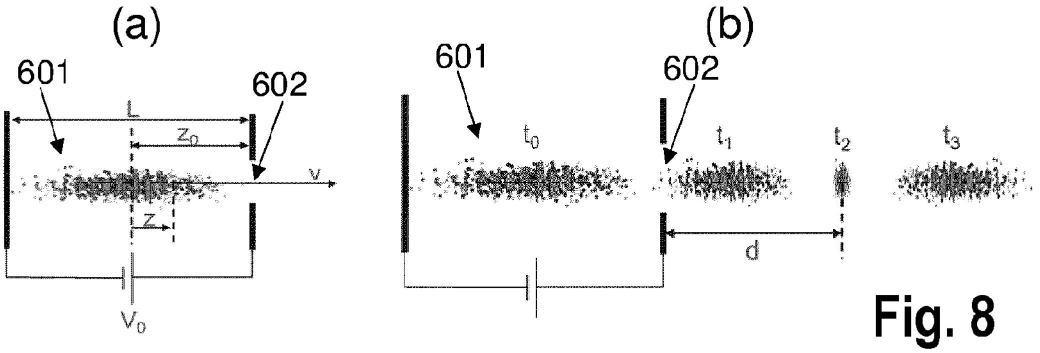
FIG. 8 depicts an example setup of two electrodes for accelerating an electron pulse out of a cavity.

FIG. 8 illustrates an example setup of two electrodes for accelerating a cloud of electrons out of a cavity 601. The electrodes generate an electric field E, which may be substantially constant throughout the cavity, and may be given by $E=V_0/L$, wherein $V_0$ is the voltage applied over the electrodes, and L is the length of the cavity 601 between the two electrodes. In FIG. 8, the velocity v acquired by an electron at position z with respect to the centre of the cloud of electrons is proportional to its initial distance $z_0$-z to the front electrode, such that $$v(z) = v_0 +$$

Here, $z_0$ is the distance of the cloud centre to the front electrode. $v_0$ is the velocity acquired by the centre of the cloud. The constant $h<0$ may be referred to as the chirp of the electron cloud, and is given approximately by $$h = -\frac{v_0}{2z_0}$$

Consequently, the electron cloud may self-compress to a very small length after propagating along a short distance d, shown in image (b) of FIG. 8, wherein:

$$d = -\frac{v_0}{h} = 2z_0$$

As described above and illustrated in FIG. 8 (*b*), an electron cloud is generated at time $t_0$, and is accelerated to exit cavity 601 with electrons having varying velocities. Due to the varying velocities, the cloud may be compressed as it accelerated further away from the exit 602, shown at $t_1$. At time $t_2$, the electron reaches its most compressed state. The location at which the electron cloud reaches its most compressed point may be referred to as the self-compression point. The distance d between the exit 602 of the cavity 601 and the self-compression point may typically be a few mm. As the electron cloud moves past the self-compression point, the electrons that were generated closer to the back of the cavity may overtake the electrons generated closer to the front and exit 602 of cavity 601. This is shown for time $t_3$, in which the size of the electron cloud has expanded compared to its size at the compression point. One of the objects of the present disclosure is to provide a method and apparatus for overcoming the challenges of self-compression.

Figure 9:
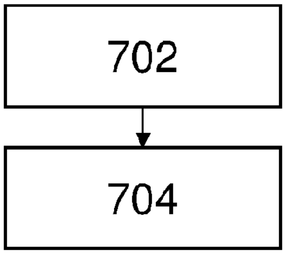
FIG. 9 depicts a flow diagram of steps in a method of controlling an electron density distribution or hard X-ray, soft X-ray and/or extreme ultraviolet generation.

According to a first aspect of the invention there is provided a method for controlling a density distribution of electrons provided by an electron source for use in X-ray generation, as depicted in FIG. 9. The method may comprise, generating a plurality of electrons from a pattern of ultracold excited atoms inside a cavity 702. The electrons may have a density distribution corresponding to the pattern of excited atoms. The electrons may be accelerated 704 out of the cavity using a non-static acceleration profile. The acceleration profile may control the density distribution of the electrons as they exit the cavity.

An advantage of the method described above is that the non-static acceleration profile can overcome the challenges described in relation to FIG. 8 above. Instead of accelerating using a static electric field, leading to electrons exiting the cavity having different velocities, depending on where in the cavity they were generated, a non-static acceleration profile can be designed to mitigate for this effect. By applying varying acceleration to the electrons inside the cavity, it may be possible to control the velocity of the electrons across the density distribution exiting the cavity. It may also be possible to control the shape and/or size of the density distribution of electrons as they exit the cavity.

The acceleration profile may be designed in such a way that it controls the velocity of the electrons in the cavity such that the velocity of the electrons is substantially equal as they exit the cavity. This substantially equal velocity of the electrons in the cloud may result in the density distribution of the electrons at the exit of the cavity being substantially maintained as the electrons propagate away from the cavity. The density distribution of electrons may also be referred to as a cloud of electrons, and/or as a pulse of electrons.

The acceleration profile may reduce chirp in the density distribution of electrons. A potential definition of chirp is provided in relation to FIG. 8 above. Chirp may be caused by a difference in velocity between electrons at different positions in the density distribution, causing a change in shape of the density distribution as the electrons propagate. In the instance where the velocity of all electrons in the density distribution is substantially equal as they exit the cavity, the chirp may be substantially eliminated, that is to say, the chirp may be reduced to zero. An acceleration profile that leads to a longitudinally collimated density distribution (i.e. a density distribution with zero-chirp) in which all electrons have substantially the same velocity may also be referred to as an acceleration profile that avoids self-compression of the density distribution.

The non-static acceleration profile can comprise an electromagnetic field. The field may for example be a non-static electric field $E(z,t)$. The field may vary in time t, wherein the field at any set location in the cavity varies over time. The field may also vary in position along a direction of propagation z, wherein different positions along z within the cavity may experience different field strengths at any one time. The electric field strength may change over a range during the time in which the cloud of electrons accelerates out of the cavity.

The cavity may be the volume in which the electrons are generated. The cavity may be a resonant structure for supporting the creation of high field strengths (e.g. electric fields of the order of tens of MV/m, which may result in electron bunches in a pulse with a kinetic energy in a range from several tens of keV to several of MeV). The cavity may be a (partially) enclosed space, or may be an open space. The cavity may comprise at least one exit through which electrons are able to be removed from the cavity. The cavity may be a resonant microwave structure for enabling generating electrons from a pattern of ultracold atoms. The cavity may comprise an aperture acting as an exit through which the electrons leave the cavity. The cavity may for example comprise front and back electrodes for accelerating the electrons generating within the cavity. The front electrode may comprise the aperture serving as an exit for the electron cloud. A cavity may have a rectangular shape, or a more complex non-rectangular shape for achieving a non-static acceleration profile.

The cavity may for example be an RF cavity, which may comprise a metal enclosure in which RF waves may produce an oscillating field. The field may oscillate a frequency in the range of 1-12 GHz, which may correspond to one or more standardised frequencies in the L, S, C, and X bands. The RF cavity may be powered by a klystron RF source. The RF cavity may be operated in a pulsed mode. The pulse frequency may be determined by the speed at which the ultracold atom cloud inside the cavity is replenished. This may typically be in the kHz range. Any device suitable to confine a suitably high density of atoms in the gas phase into a small volume may be used for forming the ultracold atomic cloud and pattern. This may for example comprise a magneto-optical trap.

As described above, accelerating the electrons cloud out of the cavity with a non-static acceleration profile may be achieved using a time and position dependent electric field $E(z,t)$. The electric field strength may change over a range of values during the time when the electron cloud is generated and in which the electron cloud moves towards the exit of the cavity. The range of values experienced by an electron may depend on the initial position z at which the electron is generated inside the cavity. This variation for electrons generated at different location inside the cavity may make it possible to modify the velocity distribution of the electrons. In particular, the chirp within the electron may be modified.

In order for the electric field to modify and control the velocity of electrons through a non-static acceleration profile, the electric field distribution $E(z,t)$ may vary significantly during the time it takes the electron cloud to exit the cavity. The electric field distribution $E(z,t)$ may involve field gradients that are strong enough so that electrons at different positions along propagation direction z observe significantly different field values. In this context, a field gradient $dE/dz$ that is strong enough may be around the magnitude of $E/L$, wherein E is the field strength in the cavity, and L is the length of the electron cloud. The strength of the gradient may depend on the E and L of the particular application, but may be in the range of the order of $MV/m^2$ to $GV/m^2$. The electric field distribution $E(z,t)$ may also be so strong as to accelerate the electron cloud out of the vessel with a significant velocity. In this context, a significant velocity is one for which the electron cloud may be injected into an accelerator with sufficient velocity so that X-rays may be generated after it has passed through the accelerator. This velocity may for example be at least 10% of the speed of light. Furthermore, a higher electron velocity may be preferable as a higher speed leads to fewer Coulomb interactions (collisions). These Coulomb collisions may be detrimental as they may cause bunching degradation. Therefore, reducing them by increasing the speed (beam energy) may be an advantage of increased electron velocity. An electric field having the properties described in this paragraph may for example be achieved in an RF cavity, in which a strong oscillating electromagnetic field may be established.

An example electric field suitable for use as a non-static acceleration profile may be:

$$E(z, t) = E_0 \cos\left(\frac{\pi z}{L}\right)\cos(\omega t + \varphi) \quad (1)$$

Wherein $E_0$ is the peak electric field strength, φ is the phase of the field that defines the timing of the field oscillation with respect to the ionisation step, ω is the angular frequency of the standing wave within the cavity, and L is the length of the cavity along the z-direction. The angular frequency $$\omega = \frac{\pi c}{L}$$

with c representing the speed of light. Some example values may include $$\frac{\omega}{2\pi}$$

in the range of 1 GHz to 12 GHz, for example 1 GHz-10 GHz. This may be indicated as the L, S, C, and X frequency bands. A corresponding cavity length may be in the range of 12 mm to 150 mm.

Figure 10:
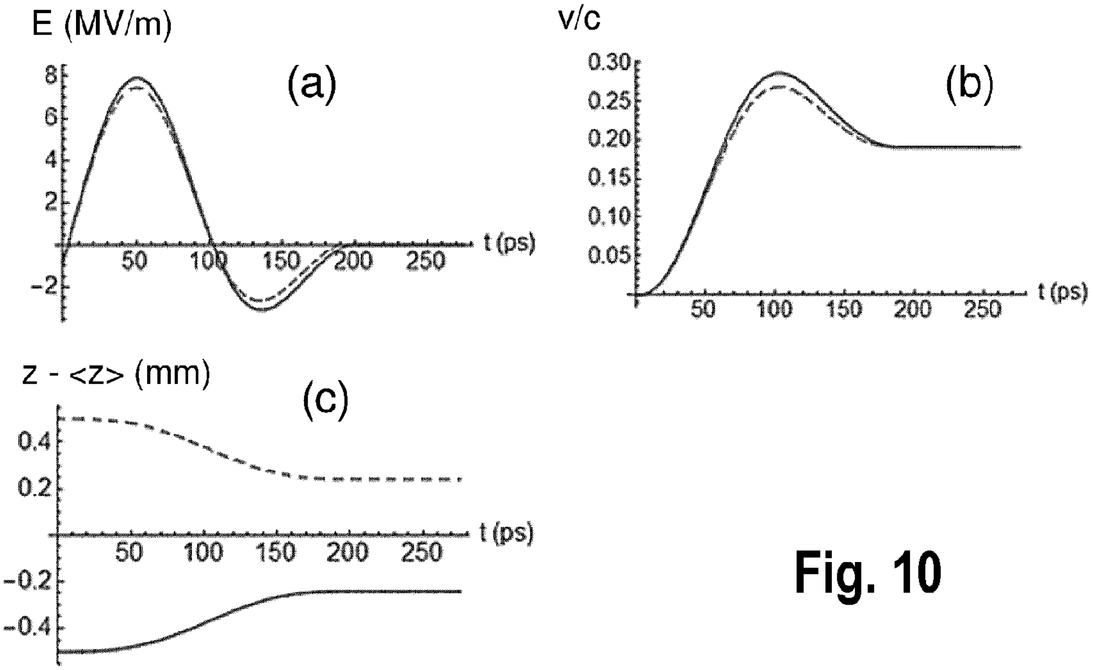
FIGS. 10(*a*)-(*c*) depict graphs of an example simulation of an electron pulse accelerated out of a cavity by a non-static acceleration profile.

FIG. 10 depicts an example simulation of an electron cloud accelerating out of a cavity by the field E(z,t) given by the equation (1) above. For this example simulation the following parameters were used: an electron cloud measuring 1 mm in length along the z-direction of propagation, a 2 GHz RF cavity with a length L=3 cm, and an electric field $E_0$=9 MV/m. In FIG. 10, the solid lines correspond to an electron at the back of the pulse, that is to say an electron generated closer to the back electrode and further away from the exit of the cavity. The dashed lines correspond to an electron at the front of the pulse, generation closed to the front electrode and closer to the exit of the cavity. FIG. 10(*a*) depicts the electric field experienced by both example electrons during their acceleration out of the cavity. In the initial stage, up to 100 ps on the graph, the back electron is at all times closer to the field maximum than the front electron. This situation is similar to the case of a static field acceleration. However, because the field oscillates in time (see equation (1)), the field may be set to reverse direction before the electrons have exited the cavity. This can be seen for example in FIG. 10(*a*) from 100 ps to 200 ps. The reversed electric field may partially slow down the electrons, which may cancel part of their acquired velocity, as illustrated in FIG. 10(*b*).

An advantage of this setup may be that the field reversal may be tuned, for example by selecting and setting suitable values for the parameters $E_0$, φ, and $z_0$, such that the velocity difference between the electrons may be cancelled. As shown in FIG. 10(*a*), from 0 ps to 100 ps the front electron is accelerated more, but it is also slowed down more during 100 ps-200 ps. The net effect may be tuned to be that both front and back electrons exit the cavity with the same velocity, as shown in FIG. 10(*b*). The same exit velocity for all electrons in the pulse is equivalent to the chirp h being tuned to zero for this electron pulse. As a result, the self-compression point of the pulse does not occur. Furthermore, during the process of accelerating the electrons inside and out of the cavity, the electrons at different positions along the z direction do not cross trajectories. The front and back electrons may exit the cavity separated in position, as illustrated in FIG. 10(*c*) in which the position of the electrons to the middle of the pulse is shown. As depicted in FIG. 10(*c*), the electron pulse may leave the cavity slightly compressed compared to the size at which it was generated.

The electrons may be a cloud of electrons forming a single pulse generated by a pulsed electron source. The electrons may be generated for example as described in relation to FIG. 7 above. The pulse may comprise a plurality of bunches.

The density distribution of electrons may be a generated pulse of electrons comprising a plurality of electron bunches. An electron pulse may comprise a plurality of electron bunches, spatially separated from each other along the z-direction. Each bunch may comprise a plurality of electrons at a higher density compared to the lower density of electrons in the areas between the bunches. The plurality of bunches may be created from the pattern of ultracold atoms present inside the cavity, for example as described in relation to FIG. 6 above.

According to the acceleration profile described in relation to FIG. 10 above, the separation between the bunches in an electron pulse may be maintained. The different bunches in a pulse may accelerate out of the cavity without overlapping with one another. The bunches may be compressed in size and moved closer together as part of the compression of the pulse as it accelerates out of the cavity. The separation of the bunches in an electron pulse may for example be in a range of 0.39 to 10 μm. The electron pulse length may be of the order of 1 mm. The number of bunches in a pulse may be in a range from 100-2500.

Although the acceleration profile is described in relation to tuning the chirp of an electron pulse to zero, the method described above may be used to set other chirp and/or velocity configurations. The chirp may be controlled independently from the velocity of the electrons, which is not possible with a static field. In particular, the beam chirp may be deliberately increased to a large value, so that the self-compression point is passed within a very short time. This may provide an alternative way to avoid the detrimental Coulomb interaction degradation in the self-compression point, as the duration of the space-charge effect may be made short enough to limit microstructure degradation.

A static electric field and an RF cavity may be used in series. Multiple RF cavities can be used in series. Although a rectangular cavity shape comprising two electrodes is described above, the method may use more general cavity shapes. Although Equation (1) indicated a single standing wave field distribution, namely the lowest order mode of the cavity, in general RF cavities may support multiple different modes. Therefore, the final velocity distribution may be further tuned by using a combination of RF cavity modes. Rather than standing wave modes of an RF cavity, RF traveling wave structures may also be used.

The control of density distribution discussed above is focused on the control along a direction of propagation of the pulse (the z-direction). The accelerating field, whether it is static or RF, and which mode of the RF cavity (and the shape of the RF cavity), may also influence the transverse velocity distribution of the electrons in the electron pulse, along the x and y directions. Any electric field has the property that longitudinal gradients may induce transverse field components. This may lead to a transversely divergent electron pulse in case of negative chirp, and a transversely convergent electron pulse in case of positive chirp. When working with RF cavities, transverse beam size and/or electron beam divergence may be controlled by additional electron optics such as for example solenoids, quadrupole magnets, electrostatic or magnetostatic transverse electron optics, or time-dependent transverse electron optics. Such electron optics may for example be provided near the exit of the cavity.

The density distribution of electrons may be used for X-ray generation. Specifically, the electrons may be used for X-ray generation through inverse Compton scattering. The method of controlling the density distribution of electrons described above may be performed by an apparatus. The apparatus may form part of or be connected to a radiation source, for example an X-ray radiation source. The apparatus may be provided for use in or with a metrology apparatus, for example for measurement and/or inspection of lithographic structures. The apparatus may be for use in a lithography application, for example the apparatus for controlling the density distribution of electrons may be provided in a lithographic cell.

Figure 11:
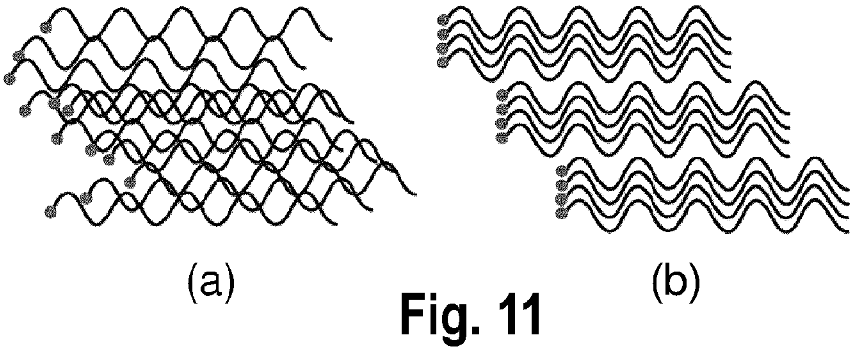
FIGS. 11(*a*), 11(*b*) depicts a schematic representation of random and bunched electrons.

Once the density distribution of electrons has been provided outside the cavity with a controlled velocity profile, the pulse may be guided to a destination for X-ray generation. As described above, the density distribution may comprise a plurality of bunches. The application of the pattern of bunches in an inverse Compton scattering X-ray source may have an advantage of increasing the brilliance and/or temporal coherence of the X-ray source. The setup may be compact compared to other types of X-ray sources achieving similar performance in brilliance. This is illustrated for example in FIG. 11, depicting electron distributions. FIG. 11(*a*) depicts randomly distributed electrons. X-ray radiation generated from these electrons may emitted incoherently due to the random distribution. This may lead to a X-ray source brilliance proportional to the number of electrons N, as described in relation to FIG. 6 above.

FIG. 11(*b*) shows electrons grouped together in bunches. The bunched density distribution may lead to an increased coherent emission of X-ray radiation when irradiated with a laser pulse. However, in order for coherent addition of the generated X-ray radiation to take place, the spacing between the bunches should approximate the wavelength of the generated X-ray radiation. The spacing between the bunches in the density distribution as it exits the cavity may be of the order of the periodicity of the standing wave pattern of the excitation lasers 504 and/or ionization lasers as described in relation to FIG. 7. This spacing may be several order of magnitude larger than the desired spacing. Therefore, in order to achieve the X-ray wavelength spacing, further control and manipulation of the density distribution of the electron pulse may be needed after the pulse exits the cavity in which it has been created. It is an object of the current description to achieve a further increase in source brilliance by manipulating the spacing between the electron bunches to be approximately equal to the X-ray wavelength. A beamline may be provided to longitudinally compress an electron pulse along the z-direction of propagation to reduce the spacing between bunches.

Figure 12:
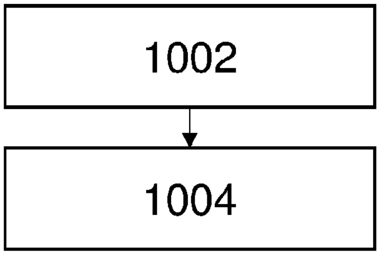
FIG. 12 depicts a flow diagram of steps in a method of compressing a density distribution comprising a bunches of electrons for coherent hard X-ray, soft X-ray and/or extreme ultraviolet generation.

FIG. 12 depicts a flow diagram of a method of compressing a density distribution comprising bunches of electrons for coherent X-ray generation. Specifically, the X-rays generated may be soft X-rays. The method comprises receiving 1002 a plurality of electron bunches having a density distribution. The plurality of electron bunches is compressed 1004 such that the distance between the bunches along a propagation direction of the electron bunches corresponds with a wavelength of X-ray radiation to be generated.

As stated above, the distance, or spacing, between the electron bunches before compression may be of the order hundreds of nanometres. The reduction of the spacing between the electron bunches to match the X-ray wavelength may have the advantage of enabling increased coherent X-ray generation through inverse Compton scattering, leading to an X-ray source with increased brilliance.

The criterion for coherent enhancement of ICS-generated X-rays may be $$k_{mod} = k_x + k_0\cos\theta_0$$

Where $$k_{mod} = \frac{2\pi}{\lambda_{mod}}$$

represents a wavenumber, with $\lambda_{mod}$ representing the spacing between the bunches (after compression), $$k_x = \frac{2\pi}{\lambda_x}$$

with $\lambda_x$ the X-ray wavelength, $$k_0 = \frac{2\pi}{\lambda_0}$$

with $\lambda_0$ the ICS laser wavelength, and $\theta_0$ the incidence angle of the ICS laser with respect to the electron beam path. The term relating to the ICS laser wavelength may be small compared to the other terms. In such a case, the equation may be approximated by $k_{mod} \approx k_x$. The spacing between the bunches before compression may be represented by $\lambda_{mod,0}$, meaning the longitudinal (along the z-direction of propagation) compression factor of the spacing may be represented as $$M = \frac{\lambda_{mod}}{\lambda_{mod,0}}.$$

For the electron density distribution described in relation to FIGS. 7 and 8, a compression by several orders of magnitude may be required to enable coherent ICS X-ray generation. Said otherwise, M may be <<1. M may also be referred to as a magnification factor or demagnification factor.

Figure 13:
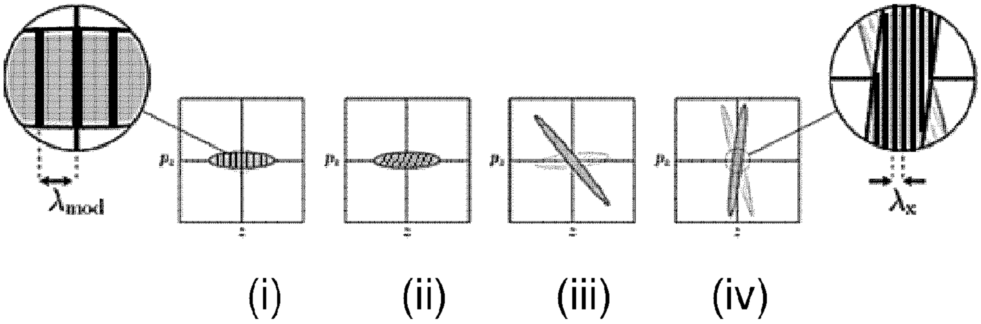
FIG. 13 depicts example phase space plots representing steps in a beamline transformation for electron pulse compression.

The compression method may be performed by a beamline. To describe the content of the beamline, it may be useful to consider the velocity and position distribution in an electron pulse in phase space. A useful way to visualize the longitudinal dynamics of electron bunches may be to plot the so-called longitudinal phase space, which is a plot of the particle momenta $p_z$ in the propagation direction versus the longitudinal positions z of the particles in the electron bunch. Example longitudinal phase space plots are depicted in FIG. 13, in which the phase space is sketched for different locations along a beamline. The darker lines indicate a high density of particles and the lighter background indicates a low density of particles. Bunches of electrons may occur as high electron density at positions $z_n = n\lambda_{mod}$, with a low electron density in between those positions. In this context the meaning of high and low density may be assessed relative to each other. Ideally the low electron density is the absence of electrons (0 electrons/$m^3$). An example high electron density may be in the range from $10^{16}$ to $10^{18}$ electros/$m^3$ at the source. At the interaction location, high density may be in the range from $10^{16}$ to $10^{18}$/M electrons/$m^3$, wherein M is the magnification factor introduced above, and a constant transverse size is assumed.

Figure 14:
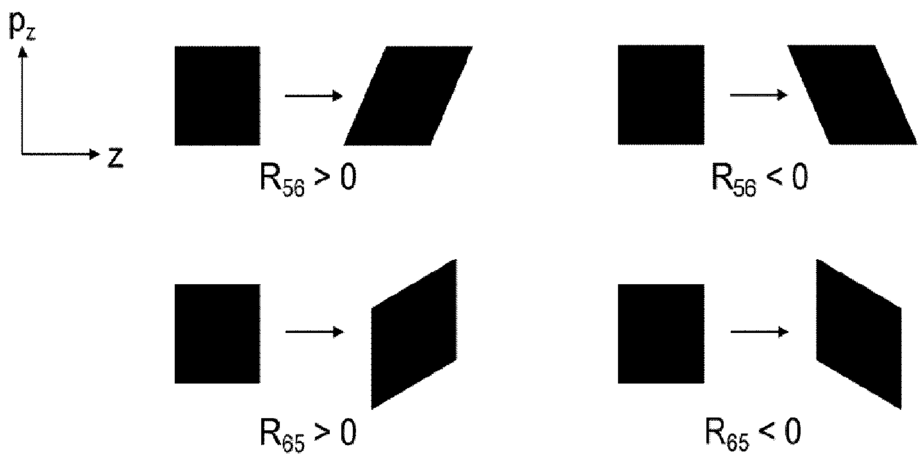
FIG. 14 depicts a schematic representation of horizontal and vertical skew in longitudinal phase space.

In the phase space representation, bunching may look like a series of vertical lines. Plot (i) may represent the state of the electron bunch at the exit of the source. The overall electron bunch may have a certain finite length and a certain spread in particle momenta, which may be represented in the graph by the width and height of the elliptical contour in the phase space called the phase space ellipse. In the phase space, the goal of the beamline may be to manipulate the electron bunches such that the final phase space (iv) shows a pattern of vertical lines spaced a factor 1/M more closely than at the source. Mathematically, this final phase space may be obtained from the initial phase space by a linear transformation. For example the density distribution of graph (i) comprising the plurality of bunches may be shrunk horizontally by a factor 1/M in graph (iv). This result may for example be obtained by a combination of two elementary linear transformations available in accelerator beamlines. These may be a horizontal skew of the phase space, and a vertical skew of the phase space. The meaning of skew in phase space is illustrated in FIG. 14. The top row shows positive and negative horizontal skew in the z-dimension. The bottom row illustrates positive and negative vertical skew in the z-dimension.

A horizontal skew may be obtained at low electron pulse energies by letting the pulse propagate over a certain distance, which constitutes a drift. This may be because particles at the top of the phase space ellipse, which have a slightly higher momentum, overtake electrons at the bottom of the phase space ellipse, which have a slightly lower momentum. For higher electron pulse energies, a horizontal skew may be obtained by letting fast particles move over a longer or smaller path than slow particles. This may for example be achieved by applying one or more magnetic fields. Standard magnetic devices to do this may include for example so-called chicanes, dog legs, and/or alpha magnets. Any arrangement causing horizontal skew in the phase space may more generally be referred to as a dispersive section. The magnitude of the skew may indicated as $R_{56}$. In this notation the 5 and 6 numbers are indices of a transfer matrix, wherein 5 and 6 represent the $5^{th}$ row and $6^{th}$ column. This may be because the z-direction is the third direction included in the transformation, with the transverse x and y directions using the first four rows and column of the transfer matrix.

A vertical skew of the phase space may be obtained by applying a z-dependent change of the particle momentum. In phase space, this may move one end of the phase space ellipse up and the other end down. Such a vertical skew may for example be achieved by letting the electron pulse propagate through an RF cavity structure. Inside the RF cavity structure the phase of the oscillating electric field may be such that the field is in the accelerating direction when the front (or back) of the pulse crosses the cavity, and may be in the decelerating direction by the time the back (or front) of the electron pulse crosses the cavity. More generally, any beamline element causing a vertical skew in phase space may be called a chirper. The magnitude of the skew may be indicated as the $R_{65}$ (see FIG. 14 for the sign convention).

In terms of the elementary skewing operations, a beamline may include a series of beamline elements which apply the desired transformation steps with the desired magnitude and in the desired order. These beamline elements may include electron optics, as described above. As illustrated in FIG. 13, the operations to achieve a compression along the direction of propagation may include, from the initial pulse (i) to (ii), a dispersive section with $R^1_{56}>0$. This may be formed by any of the horizontal skew methods described above. From (ii) to (iii) a chirper with $R_{65}<0$. This may be obtained for example by a number of RF cavities in series. From (iii) to (iv) a second dispersive section with $R^2_{56}>0$ may be provided. In order to achieve a compression of factor M, the following relations may have to be met:

$$\frac{1}{R^1_{56}} + \frac{1}{R^2_{56}} = -R_{65} \tag{2}$$

$$\frac{R^2_{56}}{R^1_{56}} = \pm M \tag{3}$$

Alternative versions of a beamline may be provided to achieve a demagnification M. For example any three beamline elements that satisfy the equations (2) and (3) above. Furthermore, the compression may be distributed over multiple stages (e.g. using more than 3 transformation elements). In a multiple stage beamline, each stage may be similar to the beamline described above. The product of the demagnification factors of all the stages may equal the total compression M. Such a multi-stage demagnification may be advantageous if a large compression M is needed (M<<1). This may be because for large compression, the total length of the beamline may be shortened by using multiple smaller compression stages in series. Any beamline leading to demagnification of the phase space in the z-direction may be used in a beamline. The beamline may be characterised by a transfer matrix T. The transfer matrix may indicate how the phase space coordinates z and $p_z$ are transformed by the beamline. Other than for compression, a beamline may also be used to achieve a magnification. The factor M may therefore be referred to as either/both a magnification factor and a compression factor:

$$\begin{pmatrix} z' \\ p'_z \end{pmatrix} = \begin{pmatrix} T_{11} & T_{12} \\ T_{21} & T_{22} \end{pmatrix} \begin{pmatrix} z \\ p_z \end{pmatrix} = T \begin{pmatrix} z \\ p_z \end{pmatrix}$$

Using this notation, any transfer matrix of the form $$T = \begin{pmatrix} M & 0 \\ x & \frac{1}{M} \end{pmatrix}$$

with x an arbitrary number, achieves a magnification of factor M.

Optionally, a dechirper (i.e. a second chirper with $R_{65}$ opposite to that of the first chirper) may be added to the end of the beamline to remove the remaining correlation between z and $p_z$ in the final bunch. Optionally, at any position in the beamline an accelerator may be placed to increase the overall bunch energy. This may be advantageous to further increase the photon energy of the x-rays produced by ICS.

In a beamline, a significant complication may arise in that the electrons in the electron pulse repel each other. This may lead to the bunches in the pulse expanding into the interbunch spacing, due to the larger density of electrons in the bunches. In addition, a nonlinear relation may exist between velocity and momentum, characteristic for mildly relativistic electron pulses. This nonlinear relation may cause deformations of the phase space. Due to these phenomena, not all beamlines that satisfy Equations. 2 and 3 perform equally well. Detailed particle tracking simulations accounting in detail for space charge and relativistic effects show that the example beamline in FIG. 13 may perform well for electron pulses containing up to 3000 electrons. In the example beamline, the chirper may be designed as a series of multiple sequential RF cavities rather than a single RF cavity. This may be to limit the required field strength per cavity.

In the example beamline, a bottleneck related to a parasitic compression may prevent increase of the number of particles, as this increase may significantly affect the bunching structure of the electron pulse. Parasitic compression may be a point in the beamline where the pulse length goes through a minimum. This point may occur between the chirper and the interaction point with the ICS laser in a case where $R^1_{56}>0$. Therefore, an alternative beamline which may be of interest may be one in which the first dispersive section has $R^1_{56}<0$. In addition, the absolute magnitude of this section may be large in view of equation 3 and the large demagnification required. In practice, this section may be formed by a specialized alpha magnet in which $|R_{56}^1|$ is maximized.

Figure 15:
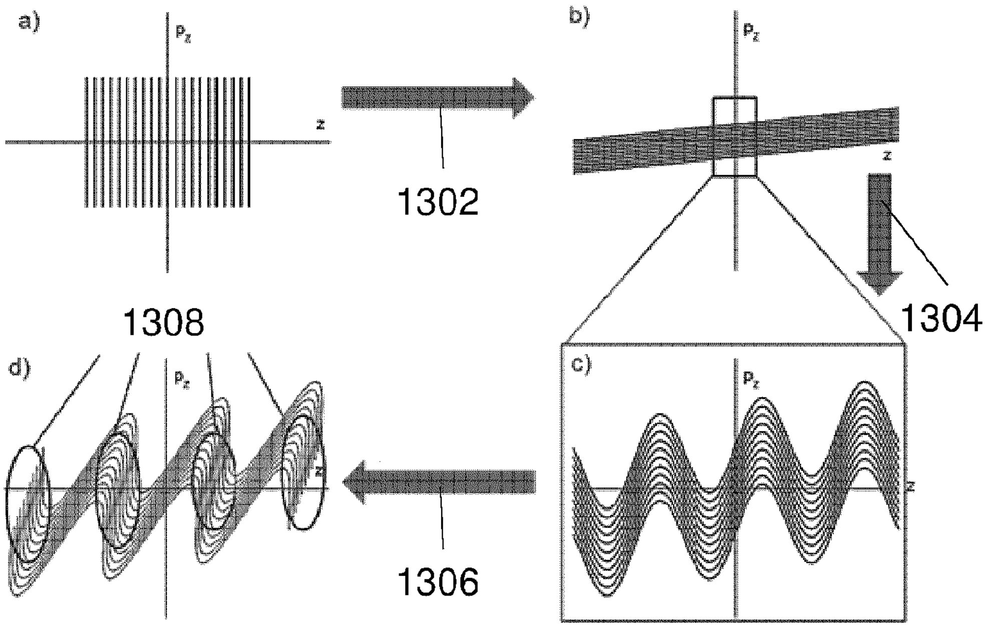
FIGS. 15(*a*)-(*d*) depicts a schematic representation of steps of electron pulse compression using echo-enhanced harmonic generation.

An alternative to the beamline using electron optics described above, may be to achieve compression using echo enhanced harmonic generation EEHG. EEHG may obtain localized regions with narrow-pitched bunches within a pulse that has an initial wide-pitch bunching structure. The principle of using EEHG for pitch compression is illustrated in FIG. 15. An electron pulse with a plurality of bunches (illustrated in 15(*a*)) for which the inter-bunch spacing is to be compressed may be led through a dispersive section 1302. This may lead to a horizontally skewed phase space, shown in 15(*b*). The initial horizontal skew may be strong.

Figure 16:
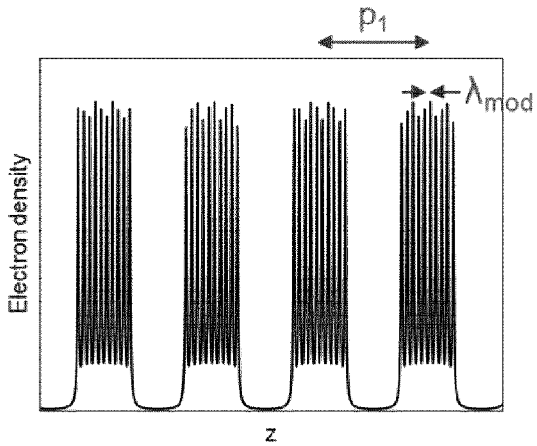
FIG. 16 depicts a graph illustrating an example electron density along a propagation direction of a compressed electron pulse comprising a plurality of bunches.

In the next step, a modulator 1304 may be applied that results in a modulation of the electron momentum, that is periodic in the z-direction, the direction of propagation of the pulse. The momentum modulation in this instance may be significantly larger in magnitude than the initial momentum spread of the pulse. This may have an advantage that the phase space after modulation exhibits regions with a plurality of closely spaced lines with a negative slope every modulation period $p_1$, as illustrated in 15(*c*). The modulated pulse may be led through a second dispersive section 1306 to introduce a second horizontal skew. This may result in the bands of lines with negative slope becoming vertically oriented 1308 (see 15(*d*)). The electron density along the z-direction corresponding to this final phase space is depicted in FIG. 16. As illustrated, the EEHG procedure may result in regions spaced a distance p1 apart with very closely spaced bunches, wherein the spacing may be controlled to be $\lambda_{mod}$. Alternative implementations of the dispersive sections may be used. Section 1302 may be provided either with a positive or negative sign. Section 1306 may alternatively be provided with negative sign, in which case the regions with large positive slope in FIG. 15(*c*) may become vertically oriented.

EEHG is described in Stupakov, Phys. Rev. Lett. 102, 74801 (2009) and Ribic et al., Nature Photonics 13, 555 (2019). There are several advantages of the setup described above over the EEHG described in those references, A first advantage is to combine the EEHG method steps above with the electron pulses obtained as described herein. Due to the control of the velocity and density distribution of the electrons in the pulse, the momentum spread of the pulses is significantly lower than that of conventional electron pulses. This may mean that a modulator with a considerably lower amplitude may be used.

Secondly, the references above describe EEHG in the context of high-energy accelerators, for use as a tool to provide ultra-relativistic electron pulses with a narrow-spaced bunches as input to free electron lasers. However, this description introduces the option of using the EEHG in a compact ICS source for X-ray generation. EEHG may therefore be applied to low-energy electron pulses. An advantage of the low-energy application may be that the dispersive sections may be implemented as simple propagation sections.

Furthermore, instead of a magnetic modulator, an optical modulator may be used. The EEHG process described in the references above describes a magnetic modulator used for the modulating step. A conventional magnetic modulator may consist of a magnetic undulator (an arrangement of magnets with alternating polarity) with a pitch $\lambda_u$. The magnetic undulator may guide the electrons to follow an undulating path. The undulator is combined with a co-propagating seed laser pulse with wavelength $\lambda_s$. Due to the undulating motion of the electrons, they will emit radiation with wavelength $$\frac{\lambda_u}{2\gamma^2},$$

wherein $$\gamma = \left(1 - \frac{v^2}{c^2}\right)^{-1/2}$$

with v the electron velocity and c the speed of light. If the undulator is resonant with the seed light, i.e. if $$\lambda_S = \frac{\lambda_u}{2\gamma^2},$$

then some electrons will on average gain energy from the interaction while others on average lose energy. The average energy may be gained and lost in a pattern such that a periodic momentum modulation results, for example as illustrated in FIG. 15(*c*).

However, for an ICS X-ray source, the value of $\gamma$ may be in the range of 2-10. This may require a resonant magnetic undulator with sub-mm pitch in combination with conventional seed laser sources. This pitch may be challengingly small to achieve. It is proposed herein that this challenge may be overcome providing an optical modulator. This may be advantageous in ICS X-ray generation applications, due to the inter-bunch spacing of the order of X-ray wavelength radiation required for coherent enhancement. In an optical modulator, the magnetic undulator may be replaced by a counter-propagating laser with wavelength $\lambda_u$. the counter-propagating laser may be a pulsed laser radiation beam. Due to inverse Compton scattering of the counter-propagating laser, the electron pulse may emit radiation with wavelength $$\frac{\lambda_u}{4\gamma^2}.$$

If the radiation wavelength of the seed laser is resonant with the counter-propagating laser radiation, e.g. when $$\lambda_S = \frac{\lambda_u}{4\gamma^2},$$

then the same periodic momentum modulation may result as when using conventional magnetic modulator. In the formulas above, approximations have been made for simplicity of the formulas. The ultrarelativistic approximation has been made. An approximation that the seed laser and modulation lased propagate along the direction of the electron velocity has been made. The skilled person would appreciate that generalised, non-approximated formulas may be used instead.

Optical modulators comprising an arrangement of a seed laser and a counter-propagating laser are possible with different angles of incidence of the lasers. Setups of different angles may have corresponding generalized resonant criteria. An advantage of using an optical modulator may be that they require a shorter path length in the beamline compared to the size required for a magnetic modulator. The path length may be as short as the focal region of the two crossed seed and counter-propagating laser beams. Another advantage may be that when the optical modulator forms part of an X-ray radiation source, one or more lasers may be present in other portions of the setup. As a result, the counter-propagating and/or seed laser sources may be used multiple times across the X-ray source setup. For example, a laser used in another part of the X-ray source may be simultaneously used as the counter-propagating source in an optical modulator, without the need to provide additional lasers.

Figure 17:
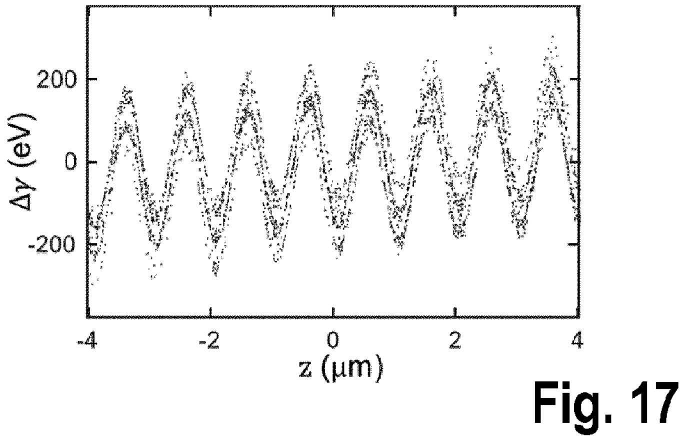
FIG. 17 depicts example particle tracking simulations for echo enhanced harmonic generation compression using an optical modulator.

Furthermore, in a low-energy electron pulse application, as for ICS-generated X-rays, the required electromagnetic forces in the modulator may be sufficiently low (e.g. of the order of μJ) that they can be provided by the optical fields of pulsed lasers. This would not be possible in the case of the ultrarelativistic electron pulses in the more conventional high-energy free electron laser application. FIG. 17 depicts the results of example particle tracking simulations, showing the phase space of a small slice of the electron pulse after application of an optical modulator consisting of two crossed laser beams. The graphs shows a structure of parallel bands of a high electron density along the z-direction, modulated to a sinusoidal shape, as described above. Electromagnetic forces in the modulator may be quantified by the laser intensity. The requirement for the modulator may be that the imposed energy modulation is larger than the intrinsic energy spread of the electron pulse. The laser intensity needed to fulfill this requirement may be proportional to the product of electron energy and electron energy spread. For the ultracold electron pulses described herein, the energy may for example be of the order of a few MeV. The energy spread may be a few eV. This may lead to a required laser intensity of $10^{17}$-$10^{19}$ W/m$^2$. This may easily be achieved using commercial femtosecond lasers at a typical kHz repetition rate of the ultracold electron source. In contrast, ultrarelativistic electron pulses may have an energy close to 1 GeV and an energy spread close to 1 MeV. This may lead to a required laser intensity of $10^{25}$ W/m$^2$. This is a very high intensity that may not be reached by available lasers at kHz repetition rate. For ultrarelativistic electron pulses, one may therefore have to resort to magnetic modulators.

Figure 18:
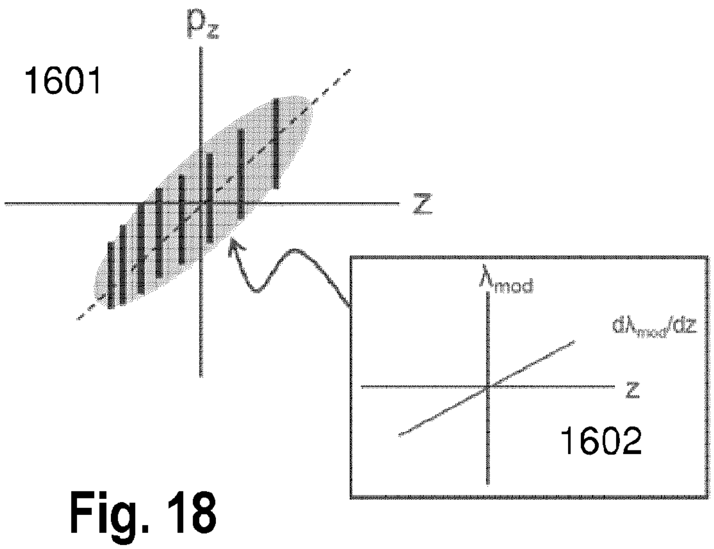
FIG. 18 depicts example representations in phase space of kinetic energy, bunch spacing, and their longitudinal derivatives.

The electron pulses with controlled density and velocity distributions, and/or the beamlines described above, may be used to generate X-ray pulses. An electron pulse comprising a plurality of electron bunches may be characterized by its kinetic energy U and its bunching pitch/spacing $\lambda_{mod}$. It may be possible to achieve a variety of ICS-generated X-ray pulses by controlling the average values of U and $\lambda_{mod}$, and additionally or alternatively their longitudinal derivatives dU/dz and d$\lambda_{mod}$/dz. FIG. 18 depicts example effects of controlling these different characterizing properties. Graph 1601 illustrated longitudinal momentum of the bunches along the z-direction. The slope indicated by the dashed line may be proportional to the rate of change of kinetic energy along z. Graph 1602 shows the pitch, or inter-bunch spacing, along the z-direction. The slope represented the rate of change of the pitch along the propagation direction z of the electron pulse.

An electron pulse with nonzero energy derivative dU/dz may be said to be energy-chirped. An electron pulse with nonzero bunching derivative d$\lambda_{mod}$/dz may be said to be bunching-chirped. The energy chirp of the pulse may be controlled at the electron source, for example by an appropriate choice of RF phase and position of the atomic cloud. The energy chirp of the electron pulse may alternatively or additionally be controlled in a beamline, for example by using a chirper. The bunching chirp of an electron pulse may be controlled by manipulating a standing wave in the electron source. This may for example be achieved by crossing strongly diverging excitation laser beams and/or spatial light modulators, or by introducing nonlinearities in the beamline skew operations.

Furthermore, ICS laser pulses used to irradiate the electron pulses to induce inverse Compton scattering X-ray generation, may be deliberately chirped as well. A laser pulse in which the wavelength gradually decreases from front to back may be referred to as a laser pulse with positive chirp $c_0>0$. Colliding energy-chirped and/or bunching-chirped electron pulses with chirped ICS laser pulses may provide opportunities described below.

A first opportunity may be the generation of extremely short, attosecond X-ray pulse generation. This may be achieved by colliding bunching-chirped electron pulses with chirped laser pulses. This may result in temporal compression of the generated X-ray pulses. The compression mechanism may be similar to the operating principle of chirped mirrors. A chirped laser pulse may be longitudinally compressed by having different wavelengths penetrate to different depths into the mirror surface before they reflect. By tuning the path lengths of the different wavelength radiation, sections of the laser pulse corresponding to different wavelengths can be made to overlap. This may result in a compressed reflected pulse. A mechanism for ultrashort X-ray pulse generation may be achieved based on the same compression principle.

A negatively bunching-chirped electron bunch (d$\lambda_{mod}$/dz<0) may be collided with a counter-propagating positively chirped laser pulse. Due to inverse Compton scattering, the electrons may emit X-ray radiation with wavelength $\lambda_x(t)=\lambda(t)/4\gamma^2$. Because the pulse is chirped, this emitted wavelength varies along the duration of the laser pulse. Only during a short time interval somewhere in the laser pulse is the local bunching of the electron pulse resonant with the emitted wavelength. At the point where the condition for coherent enhancement $k_{mod}=k_x+k_0 \cos \theta_0$ is satisfied, the emitted X-ray radiation may be coherent amplified. This condition will be met at a different location for different parts (slices) of the electron pulse along the z-direction. Therefore, each slice of the electron pulse may emit a short burst of amplified X-ray radiation. Furthermore, because the electron pulse is bunching-chirped, the resonant time interval may be different for different slices in the electron pulse.

By controlling the bunching chirp and laser chirp to have an advantageous relationship, the short bursts of X-ray radiation emitted by individual slices of the electron pulse may be made to overlap. The result may be a very short and intense X-ray pulse, for example a pulse in the attosecond range. This concept may be understood by considering a slice of the pulse that is resonant near the front of the laser pulse, and one that is resonant near the back of the pulse. The front of the laser should be resonant with the trailing slice of the pulse such that the resonantly scattered radiation reaches the front slice when it is resonant with the back of the laser.

Another opportunity may include the control of the spectral bandwidth of an X-ray pulse. This may be achieved by choosing a combination of energy-chirp of the electron pulse and chirp of the laser pulse. The bunching chirp may be zero or non-zero. Due to inverse Compton scattering, the electrons in the pulse may emit X-ray radiation at wavelength $\lambda_x(t)=\lambda(t)/4\gamma^2$. This wavelength may vary along the duration of the laser pulse, because the laser pulse is chirped. Due to the electron pulse being energy-chirped, the bunch spacing is resonant with the emitted wavelength only during a short time interval somewhere in the laser pulse. As above the resonance condition may be $k_{mod}=k_x+k_0 \cos \theta_0$. During the interval when the resonance condition is met, emitted X-ray radiation may be coherently amplified. In an approximated view, this may occur when the emitted radiation $\lambda_x(t)$ equals the bunching pitch $\lambda_{mod}$. However, because the energy, and hence $\gamma$, may vary over the pulse, the particular part $\lambda(t)$ of the laser pulse that is resonant and coherently amplified according to $\lambda(t)/4\gamma^2=\lambda_{mod}$ may also vary over the electron pulse.

For example, if the energy chirp is positive and the laser chirp is negative, the X-ray radiation emitted by the front of the electron pulse may be resonant with the interbunch spacing when excited by the back of the laser pulse (large $\lambda$ combined with large $\gamma$). The X-ray radiation emitted by the back of the electron pulse may be resonant with the interbunch spacing when excited by the front of the laser pulse (small $\lambda$ combined with small $\gamma$). The result may be that all parts of the electron pulse become resonant within a relatively short time interval. The result of this is may be that the total X-ray pulse is short in time. This may correspond to the X-ray pulse having a broad spectral bandwidth. In the other extreme, for example when both the energy chirp and the laser chirp are positive the opposite may occur. The front of the electron pulse may be resonant with the front of the laser pulse. The back of the electron pulse may be resonant with the back of the laser pulse. Since the fronts of electron pulse and counter-propagating laser pulse meet first, and the backs of the electron pulse and laser pulse meet only some time later, the time at which the different parts of the electron pulse emit coherently amplified radiation may be distributed over a relatively long interval. This may result in a relatively long X-ray pulse, which may correspond to a narrow spectral bandwidth.

Further embodiments are disclosed in the subsequent numbered clauses:

1. A method for controlling a density distribution of electrons provided by an electron source for use in hard X-ray, soft X-ray and/or extreme ultraviolet generation, the method comprising:
   generating a plurality of electrons from a pattern of ultracold excited atoms using an ionization laser inside a cavity, wherein the electrons have a density distribution determined by at least one of the patterns of excited atoms and the ionization laser; and
   accelerating the electrons out of the cavity using a non-static acceleration profile, wherein the acceleration profile controls the density distribution of the electrons as they exit the cavity.
2. A method according to clause 1, wherein the acceleration profile controls the velocity of the electrons in the cavity such that the velocity of the electrons is substantially equal as they exit the cavity.
3. A method according to any of the preceding clauses, wherein the density distribution of electrons comprises a plurality of bunches of electrons.
4. A method according to any of the preceding clauses, wherein the acceleration profile reduces chirp in the density distribution of electrons exiting the cavity.
5. A method according to any of the preceding clauses, wherein the acceleration comprises a non-static electromagnetic field.
6. A method according to clause 3, wherein the non-static electromagnetic field comprises a component that varies in time.
7. A method according to any of clauses 5-6, wherein the non-static electromagnetic field comprises a component that varies in position within the cavity.
8. A method according to any of the preceding clauses, wherein the electron density distribution matches the pattern of ultracold excited atoms.
9. A method according to any of the preceding clauses, wherein the electron density distribution is determined by a structured ionization laser.
10. A method according to any of the preceding clauses, wherein the cavity is a resonant microwave structure.
11. A method according to any of the preceding clauses, wherein the hard X-ray, soft X-ray and/or extreme ultraviolet generation is achieved using inverse Compton scattering.
12. An apparatus for controlling a density distribution of electrons provided by an electron source for use in hard X-ray, soft X-ray and/or extreme ultraviolet generation, wherein the apparatus is configured to perform a method according to any of clauses 1-11.
13. A radiation source comprising an apparatus according to clause 12.
14. A metrology apparatus comprising an apparatus according to clause 12.
15. A lithographic cell comprising an apparatus according to clause 12.
16. A method of compressing a density distribution comprising bunches of electrons for coherent hard X-ray, soft X-ray and/or extreme ultraviolet generation, the method comprising:
   receiving a plurality of electron bunches having a density distribution; and
   compressing the plurality of electron bunches such that the distance between the bunches along a propagation direction of the electron bunches corresponds with a wavelength of hard X-ray, soft X-ray and/or extreme ultraviolet radiation to be generated.

17. A method according to clause 16, wherein the bunches of electrons are compressed using echo enhanced harmonic generation.
18. A method according to any of clauses 16-17, wherein the bunches of electrons are compressed using electron optics.
19. A method according to any of clause 16-18, wherein the coherent hard X-ray, soft X-ray and/or extreme ultraviolet generation is achieved using inverse Compton scattering.
20. An assembly for compressing a density distribution comprising bunches of electrons for coherent hard X-ray, soft X-ray and/or extreme ultraviolet generation, wherein the assembly is configured to perform a method according to any of clauses 16-19.
21. A method of echo-enhanced harmonic generation for coherent hard X-ray, soft X-ray and/or extreme ultraviolet generation, the method comprising:
    receiving a plurality of bunches of electrons, wherein each bunch comprises a momentum spread;
    propagating the electrons through a dispersive section, introducing a skew in phase space along a direction of propagation;

applying, using an optical modulator, a momentum modulation to the bunches of electrons that is periodic along the direction of propagation; and propagating the electrons through a second dispersive section, introducing a second skew in phase space along the direction of propagation, the second skew modifying the modulated momentum of the bunches to provide a plurality of bunches with a reduced separation along the direction of propagation compared to the received plurality of bunches.

22. A method of generating attosecond hard X-ray, soft X-ray and/or extreme ultraviolet pulses, the method comprising:

obtaining a plurality of bunches of electrons;

introducing a chirp in a separation between the plurality of bunches; and irradiating the chirped bunches with a counter-propagating chirped radiation pulse for generating hard X-ray, soft X-ray and/or extreme ultraviolet radiation, wherein the separation chirp of the bunches matches the chirp of the radiation pulse according to a resonance condition, thereby generating an attosecond hard X-ray, soft X-ray and/or extreme ultraviolet pulse.

23. A method according to clause 22, wherein the separation chirp in the bunches and the in radiation pulse is positive.
24. A method according to any of clauses 22-23, wherein the kinetic energy chirp is set to control the bandwidth of the hard X-ray, soft X-ray and/or extreme ultraviolet radiation to be generated.
25. A method according to any of clauses 22-24, wherein introducing a chirp on a separation between the plurality of bunches comprises controlling the longitudinal rate of change of at least one of the kinetic energy of the bunches of electrons and the pitch of the bunches of electrons.

Although specific reference may be made in this text to the use of lithographic apparatus in the manufacture of ICs, it should be understood that the lithographic apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments in the context of a lithographic apparatus, embodiments may be used in other apparatus. Embodiments may form part of a mask inspection apparatus, a metrology apparatus, or any apparatus that measures or processes an object such as a wafer (or other substrate) or mask (or other patterning device). These apparatuses may be generally referred to as lithographic tools. Such a lithographic tool may use vacuum conditions or ambient (non-vacuum) conditions.

Although specific reference may be made in this text to embodiments in the context of an inspection or metrology apparatus, embodiments may be used in other apparatus. Embodiments may form part of a mask inspection apparatus, a lithographic apparatus, or any apparatus that measures or processes an object such as a wafer (or other substrate) or mask (or other patterning device). The term "metrology apparatus" (or "inspection apparatus") may also refer to an inspection apparatus or an inspection system (or a metrology apparatus or a metrology system). E.g. the inspection apparatus that comprises an embodiment may be used to detect defects of a substrate or defects of structures on a substrate. In such an embodiment, a characteristic of interest of the structure on the substrate may relate to defects in the structure, the absence of a specific part of the structure, or the presence of an unwanted structure on the substrate.

Although specific reference may have been made above to the use of embodiments in the context of optical lithography, it will be appreciated that the invention, where the context allows, is not limited to optical lithography and may be used in other applications, for example imprint lithography.

While the targets or target structures (more generally structures on a substrate) described above are metrology target structures specifically designed and formed for the purposes of measurement, in other embodiments, properties of interest may be measured on one or more structures which are functional parts of devices formed on the substrate. Many devices have regular, grating-like structures. The terms structure, target grating and target structure as used herein do not require that the structure has been provided specifically for the measurement being performed. Further, pitch of the metrology targets may be close to the resolution limit of the optical system of the scatterometer or may be smaller, but may be much larger than the dimension of typical non-target structures optionally product structures made by lithographic process in the target portions C. In practice the lines and/or spaces of the overlay gratings within the target structures may be made to include smaller structures similar in dimension to the non-target structures.

While specific embodiments have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

Although specific reference is made to "metrology apparatus/tool/system" or "inspection apparatus/tool/system", these terms may refer to the same or similar types of tools, apparatuses or systems. E.g. the inspection or metrology apparatus that comprises an embodiment of the invention may be used to determine characteristics of structures on a substrate or on a wafer. E.g. the inspection apparatus or metrology apparatus that comprises an embodiment of the invention may be used to detect defects of a substrate or defects of structures on a substrate or on a wafer. In such an embodiment, a characteristic of interest of the structure on the substrate may relate to defects in the structure, the absence of a specific part of the structure, or the presence of an unwanted structure on the substrate or on the wafer.

Although specific reference is made to SXR and EUV electromagnetic radiations, it will be appreciated that the invention, where the context allows, may be practiced with all electromagnetic radiations, includes radio waves, microwaves, infrared, (visible) light, ultraviolet, X-rays, and gamma rays. As an alternative to optical metrology methods, it has also been considered to use X-rays, optionally hard X-rays, for example radiation in a wavelength range between 0.01 nm and 10 nm, or optionally between 0.01 nm and 0.2 nm, or optionally between 0.1 nm and 0.2 nm, for metrology measurements.

The invention claimed is:

1. A radiation source for generating an emitted radiation comprising hard X-ray, soft X-ray and/or extreme ultraviolet, comprising:

a pulsed electron source configured to generate pulses of electrons;

an optical modulator configured to modulate momentum of the pulses of electrons;

an electron accelerator configured to accelerate the pulses of electrons;

and a pulsed laser configured to generate a laser beam colliding with the accelerated pulses of electrons to generate the emitted radiation.

2. The radiation source of claim 1, wherein the optical modulator comprises an arrangement of a seed laser and a counter-propagating laser with different angles of incidence of the lasers.

3. The radiation source of claim 1, wherein a propagation direction of the pulsed laser has a co-moving component to propagation direction of the pulses of electrons.

4. The radiation source of claim 1, wherein a propagation direction of the pulsed laser has a perpendicular component to propagation direction of the pulses of electrons.

5. The radiation source of claim 1, wherein a propagation direction of the pulsed laser has a counter-propagating component to propagation direction of the pulses of electrons.

6. The radiation source of claim 1, wherein the emitted radiation comprise coherent radiation.

7. The radiation source of claim 1, wherein the accelerated pulses of electrons comprise closely spaced bunches.

8. A metrology apparatus comprising the radiation source of claim 1.

9. The radiation source of claim 1, further comprising:

a dispersive section configured to compress the pulses of electrons into a plurality of electron bunches such that distance between the bunches along a propagation direction of the electron bunches corresponds with a wavelength of the emitted radiation to be generated.

10. A method of compressing a density distribution comprising bunches of electrons for coherent hard X-ray, soft X-ray and/or extreme ultraviolet emitted radiation generation, the method comprising:

receiving a plurality of electron bunches having a density distribution;

compressing the plurality of electron bunches such that distance between the bunches along a propagation direction of the electron bunches corresponds with a wavelength of hard X-ray, soft X-ray and/or extreme ultraviolet radiation to be generated;

modulating momentum of the plurality of electron bunches;

accelerating the modulated plurality of electron bunches; and colliding a laser beam with the accelerated and modulated plurality of electron bunches to produce the emitted radiation generation.

11. A method for generating an emitted radiation comprising hard X-ray, soft X-ray and/or extreme ultraviolet, the method comprising:

generating pulses of electrons;

modulating momentum of the pulses of electrons with an optical modulator;

accelerating the pulses of electrons; and colliding a laser beam with the accelerated pulses of electrons for the emitted radiation generation.

12. The method of claim 11, wherein the optical modulator comprising an arrangement of a seed laser and a counter-propagating laser with different angles of incidence of the lasers.

13. The method of claim 11, wherein the method further comprises:

compressing a plurality of electron bunches of the pulses of electrons such that distance between the bunches along a propagation direction of the electron bunches corresponds with a wavelength of the emitted radiation to be generated.

14. An Inverse Compton Scattering source for generating an emitted radiation comprising hard X-ray, soft X-ray and/or extreme ultraviolet, comprising an optical modulator configured to modulate momentum of pulses of electrons.

15. The Inverse Compton Scattering source of claim 14, wherein the optical modulator comprises an arrangement of a seed laser and a counter-propagating laser with different angles of incidence of the lasers.

16. A radiation source for generating an emitted radiation comprising hard X-ray, soft X-ray and/or extreme ultraviolet, comprising:

a pulsed electron source configured to generate pulses of electrons;

an optical modulator comprising an arrangement of a seed laser and a counter-propagating laser with different angles of incidence of the lasers and configured to modulate momentum of the pulses of electrons;

an electron accelerator configured to accelerate the modulated pulses of electrons; and a pulsed laser configured to generate a laser beam colliding with the accelerated and modulated pulses of electrons to generate the emitted radiation.

17. A metrology apparatus comprising:

a radiation source configured to produce emitted radiation comprising:

a pulsed electron source configured to generate pulses of electrons;

an optical modulator comprising an arrangement of a seed laser and a counter-propagating laser with different angles of incidence of the lasers and configured to modulate momentum of the pulses of electrons;

an electron accelerator configured to accelerate the pulses of electrons; and a pulsed laser configured to generate a laser beam colliding with the accelerated and modulated pulses of electrons to generate the emitted radiation.

18. The metrology apparatus of claim 17, wherein the radiation source further comprises a dispersive section configure to, prior to being modulated by the optical modulator, compress the pulses of electrons into a plurality of electron bunches, such that distance between the bunches along a propagation direction of the electron bunches corresponds with a wavelength of the emitted radiation to be generated.

* * * * *